United States Patent [19]

Michael et al.

[11] 4,163,249

[45] Jul. 31, 1979

[54] PICTURE PROCESSING SYSTEM FOR TELEVISION

[75] Inventors: Peter C. Michael, Newbury; Richard J. Taylor, Barnes; Martin R. Trump, Newbury, all of England

[73] Assignee: Micro Consultants Limited, Berkshire, England

[21] Appl. No.: 841,519

[22] Filed: Oct. 12, 1977

[30] Foreign Application Priority Data

Oct. 14, 1976 [GB] United Kingdom ............... 42751/76
Jul. 26, 1977 [GB] United Kingdom ............... 31355/77
Jul. 26, 1977 [GB] United Kingdom ............... 31356/77
Jul. 26, 1977 [GB] United Kingdom ............... 31357/77
Jul. 26, 1977 [GB] United Kingdom ............... 31358/77
Jul. 29, 1977 [GB] United Kingdom ............... 31996/77

[51] Int. Cl.² .......................................... H04N 9/535
[52] U.S. Cl. .................................. 358/21 R; 358/180; 358/22
[58] Field of Search ................... 358/21, 22, 180, 183, 358/166, 167

[56] References Cited

U.S. PATENT DOCUMENTS 3,944,731  3/1976  Busch .................................. 358/183
4,063,280  12/1977  Hattori et al. ......................... 358/22

Primary Examiner—Richard Murray
Attorney, Agent, or Firm—Dowell and Dowell

[57] ABSTRACT

A T.V. picture processing system comprising an input arrangement for receiving T.V. picture information and converting it into a form suitable for an input processor. The input processor modifies the size of the picture from information received from the input arrangement. A store is provided for storing the input processed picture information. A co-efficient generator is connected to the store for providing modification of incoming data to the store in dependence on the co-efficient generated and on data previously stored in the store. An output processor is provided for modifying the size of the picture from information received from the store and an output arrangement receives the information from the output processor and converts this into a composite T.V. signal.

21 Claims, 37 Drawing Figures

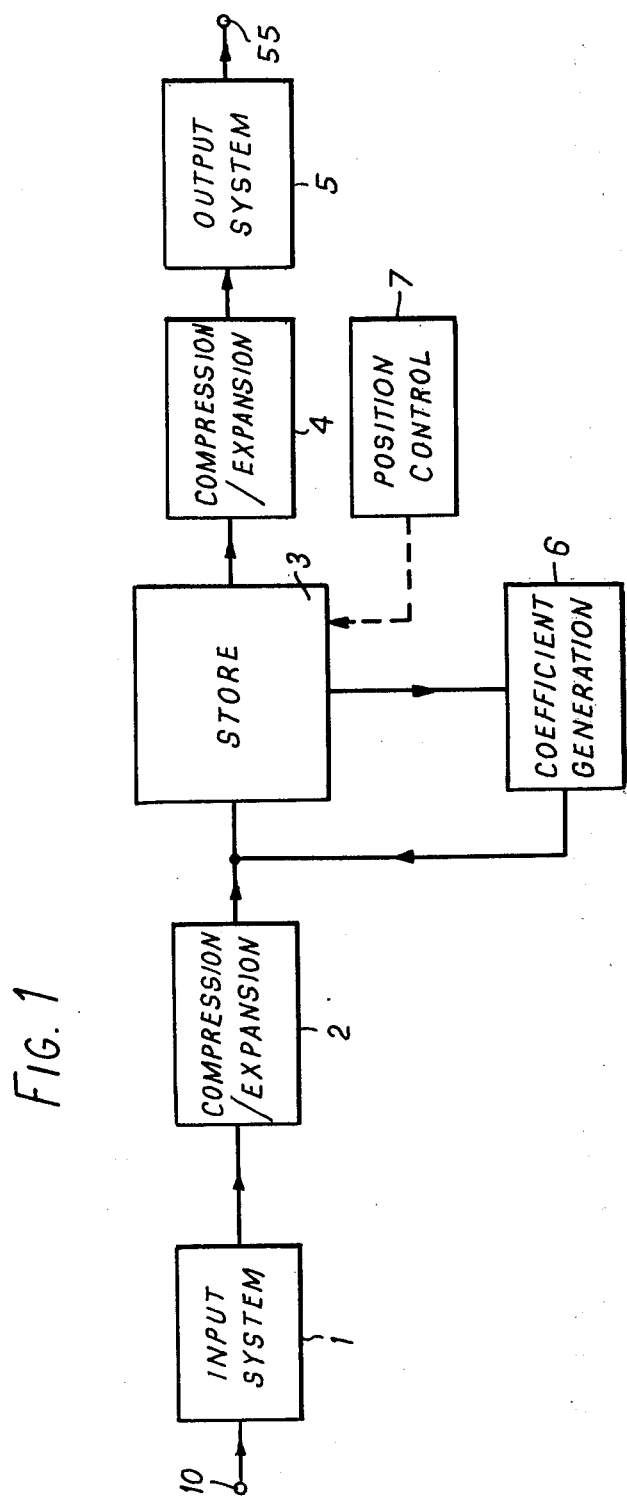

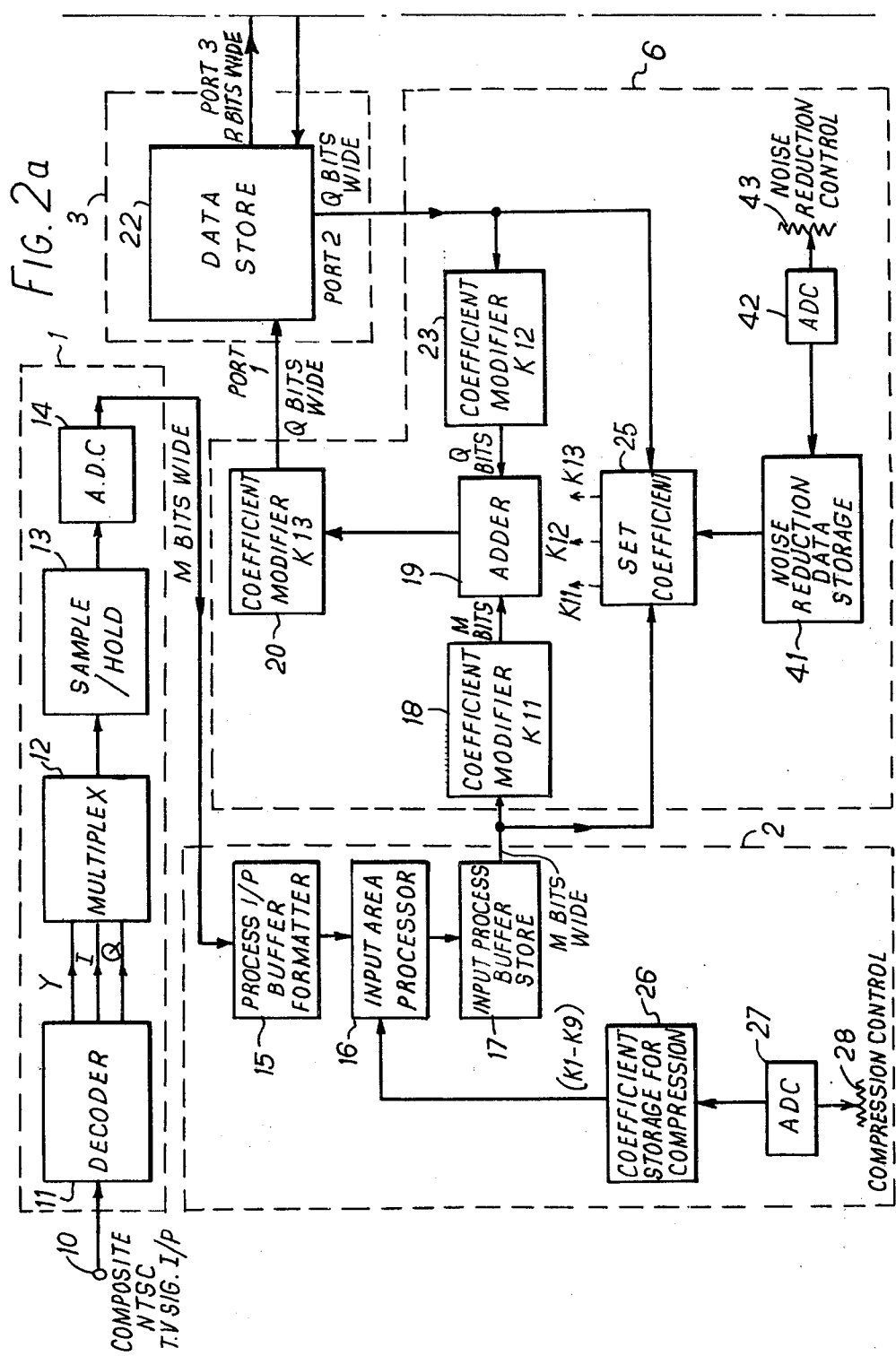

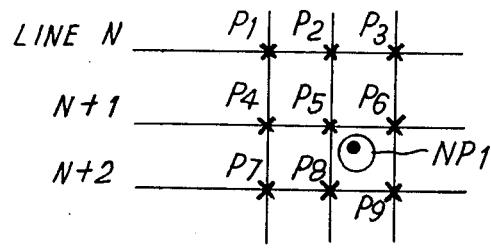
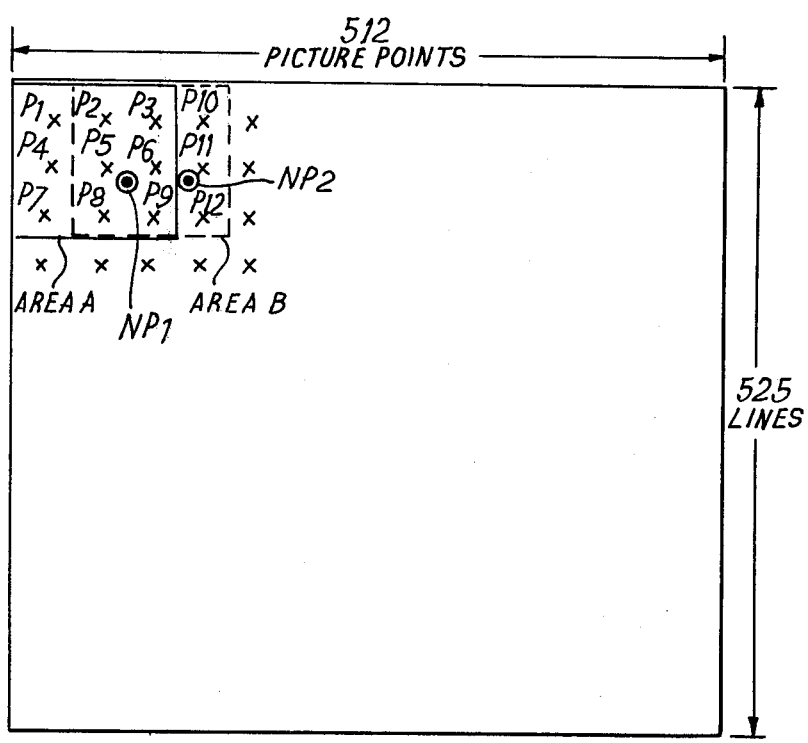

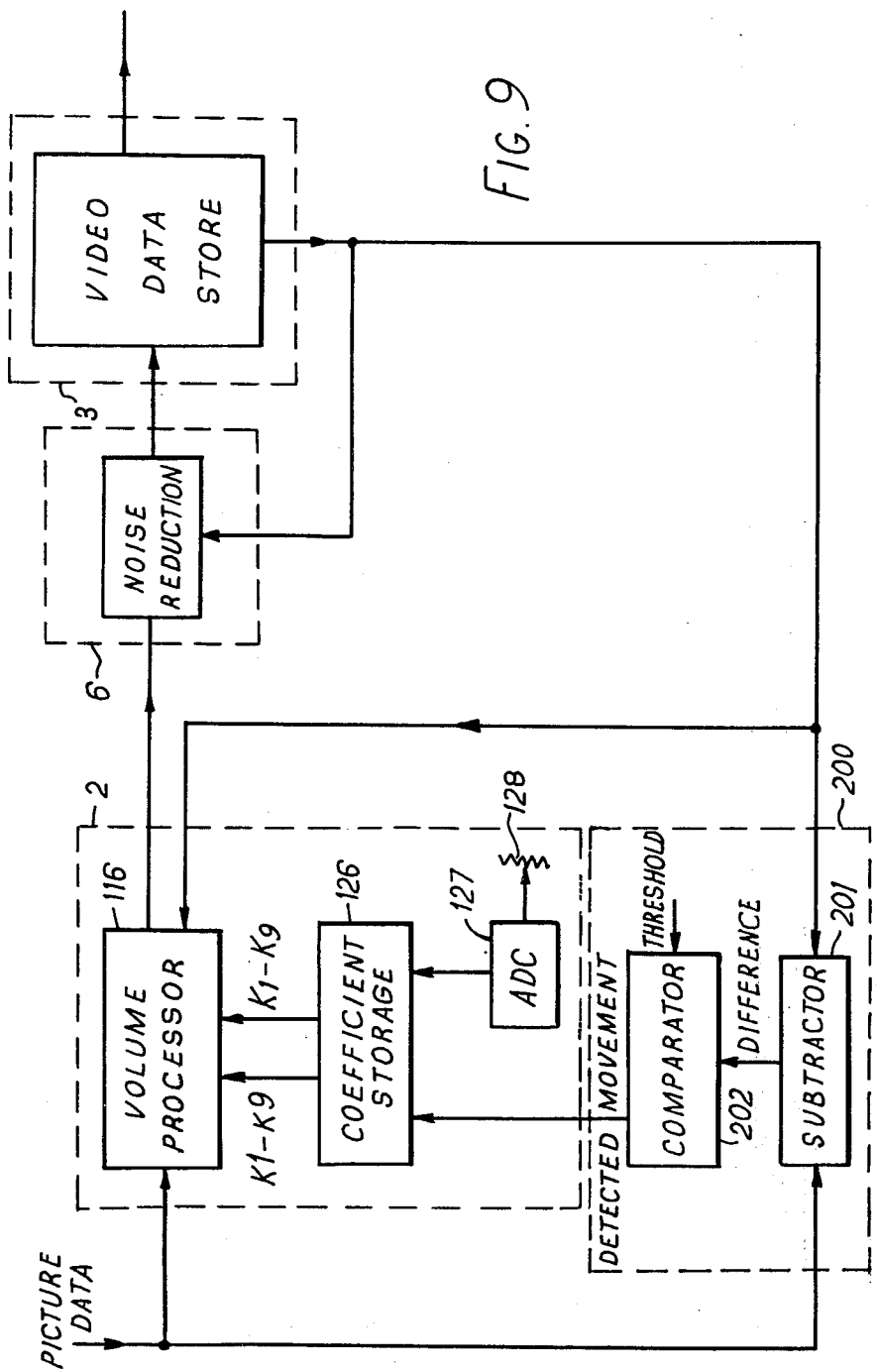

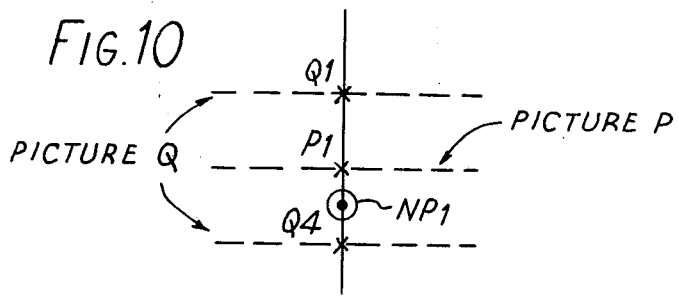
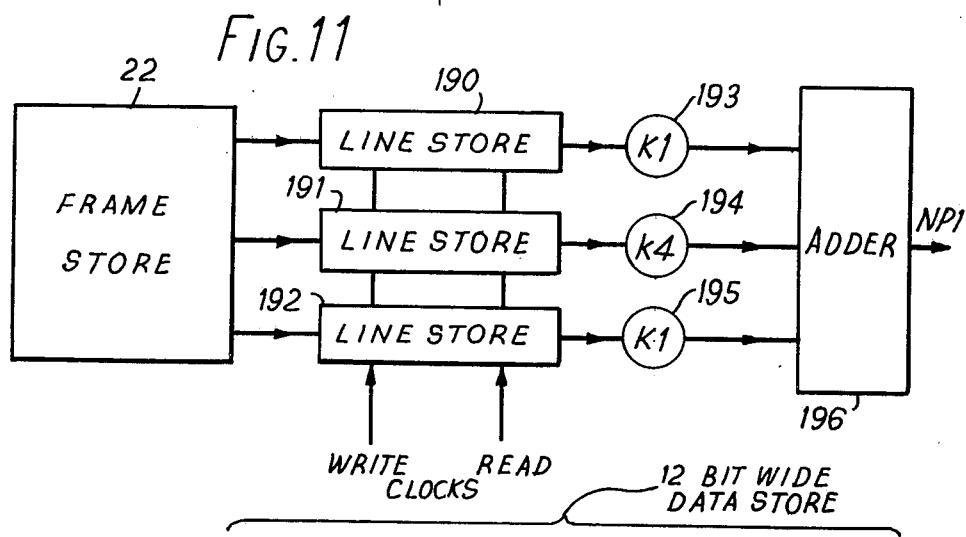
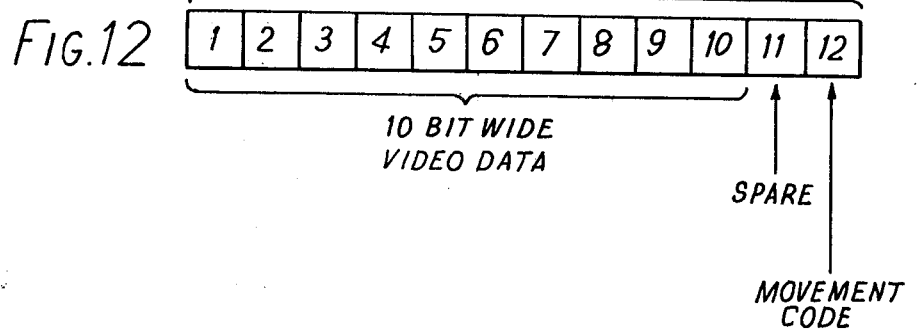
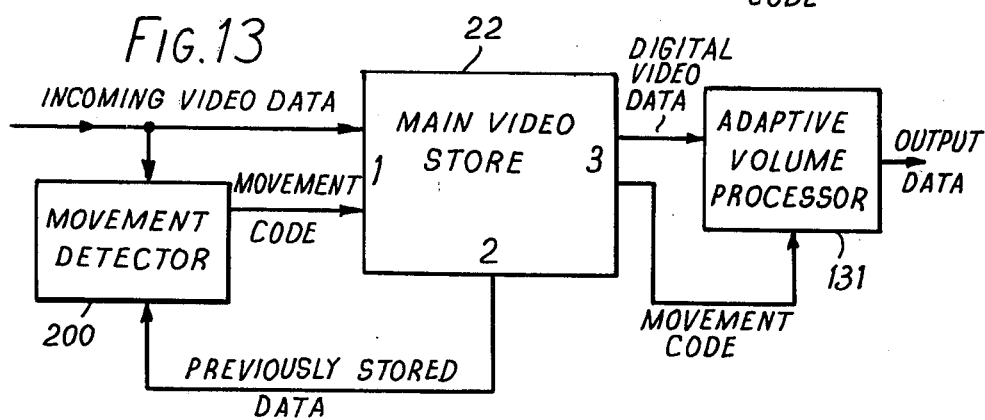

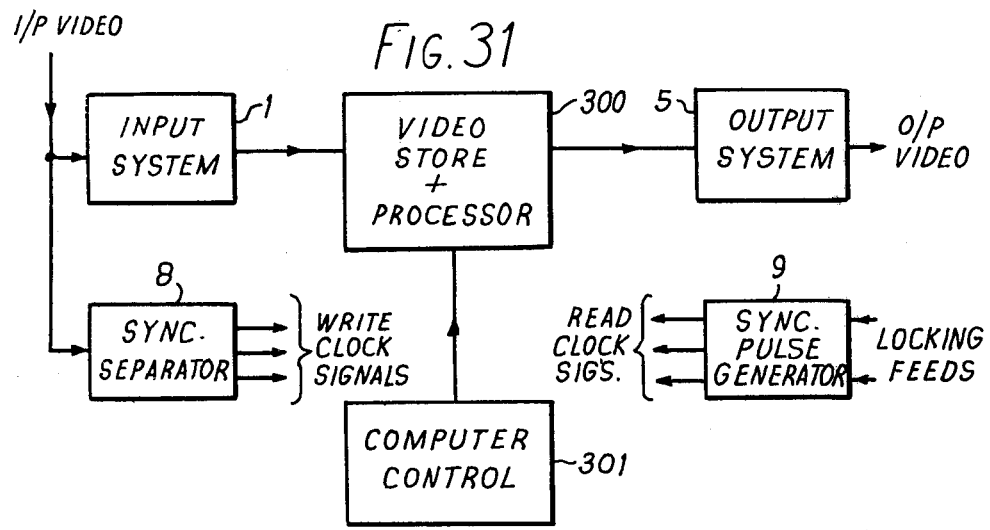

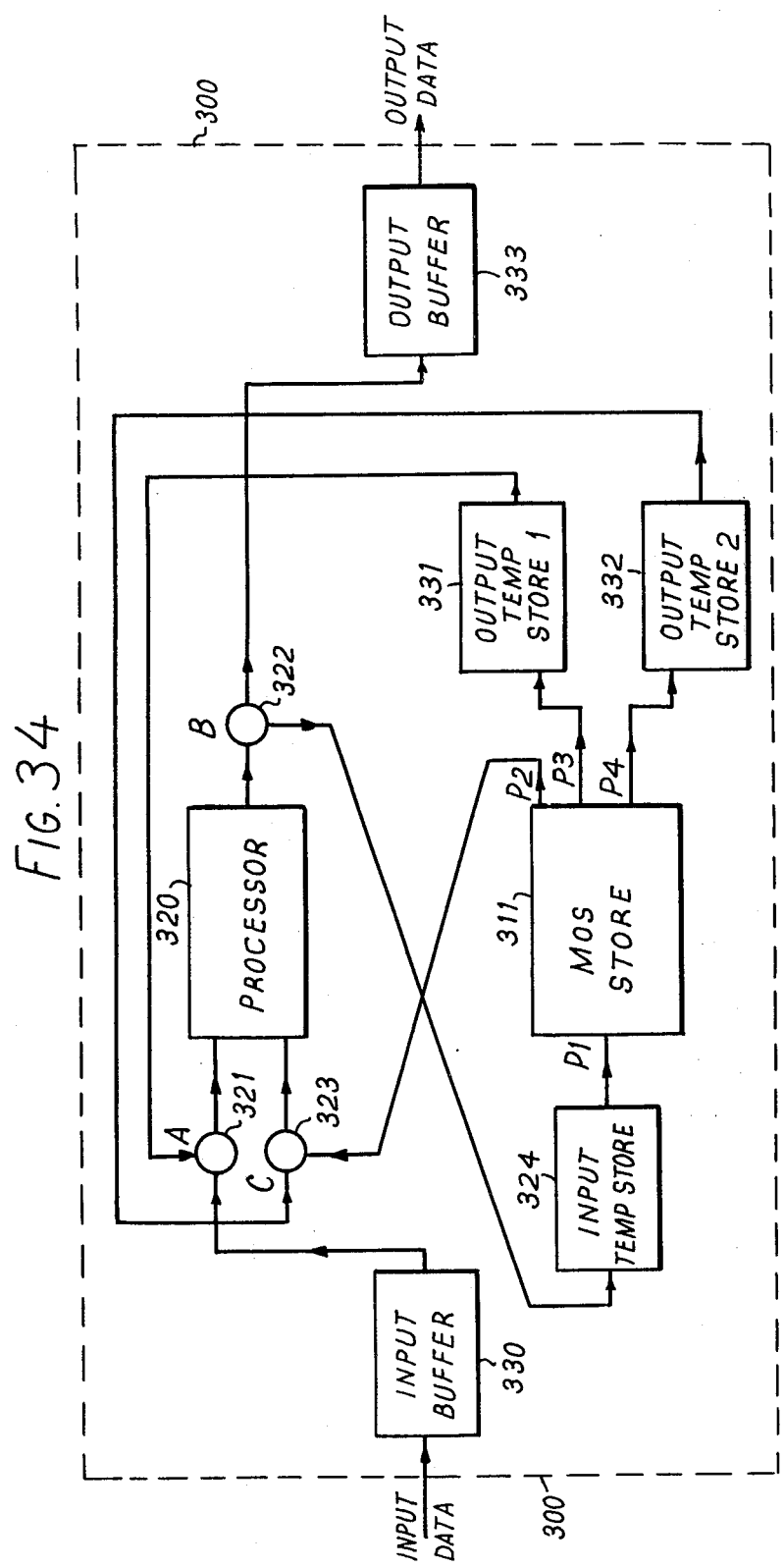

PICTURE PROCESSING SYSTEM FOR TELEVISION

BACKGROUND OF THE INVENTION

The invention relates to a picture processing system for television.

It is known for broadcasting studios to use television pictures derived from various sources e.g. cameras or video tape recorders. Various techniques using the source may be provided e.g. optical zooming with the camera or slow motion techniques.

OBJECTS OF THE INVENTION

An object of the invention is to provide a picture processing system which can be used in the studios remote from the picture sources which will provide electronic processing of the incoming signal which may be from a nonsynchronous source of low quality and to provide facilities for electronic reduction or expansion of picture size whilst providing an improved quality picture with reduced noise and time base corrected.

A further object of the invention is to provide a picture processing system suitable for digital line standards conversion of television signals.

SUMMARY OF THE INVENTION

According to the invention there is provided a T.V. picture processing system comprising input means for receiving T.V. picture information; input processing means for modifying the size of the picture from information received from said input means; storage means for storing the input processed picture information; co-efficient generator means connected to said store for providing modification of incoming data to said store in dependence on the co-efficient generated and on data stored in said store; output processing means for modifying the size of the picture from information received from said storage means and output means for receiving the information from said output processing means.

The input and output processors, the co-efficient generator and the store may be provided as separate elements or may be combined in an integrated store and processor system.

Means may be provided for varying the position of picture data stored in the storage means.

Thus the picture processing system of the invention may fulfill one or more of the requirements identified below:

1. The reduction in size of a television picture from full raster to a smaller raster size to give an effect of zoom down. The 'compressed' picture may then be positioned and superimposed on other material generated from another picture source such as a studio announcer.

2. The increase in size of a picture from full raster size to larger than full raster size so that only a proportion of the picture normally generated from the camera or other picture source is included in the transmission. This effect gives a zoom up similar to an optical zoom system. The effect of zoom up controlled electronically without interaction with the camera gives the producer of the programme local control of his camera.

3. A requirement for zoom up in slow motion exists when an event has occurred which has been recorded on a slow motion system and then later analysis of the event is required in finer detail than was previously available from the recording made in real time. This effect requires the zoom up described briefly above.

4. Noise reduction and post production effects from high quality video tape is very valuable in making multiple generation tapes which have portions of material from various sources inserted on the final tape. There is also a requirement for zoom up and zoom down in post production techniques so that the picture material may be modified in retrospect.

5. The technique called Electronic New Gathering (ENG) which makes use of lower quality tape recorders and cameras than has been the custom in the past. The result of such quality is reduction in the broadcast images quality and a considerable increase in noise. Although improvement in light weight recorders and cameras is likely to continue the electronic system to be described makes a major contribution to this area.

BRIEF DESCRIPTION OF DRAWINGS

The invention will now be described by way of example with reference to the accompanying drawings in which:

FIG. 1 shows a block diagram of the processing system of the invention.

FIG. 3 shows the area process function of the input and output processors of FIG. 2.

FIG. 4 shows the areas processed in relation to the normal T.V. picture.

FIG. 9 shows the input volume processor and movement detector used in the processing system.

FIG. 10 shows an alternative volume processing function.

FIG. 11 shows an arrangement for horizontal expansion or contraction using variable write-read clock pulse frequencies.

FIG. 12 shows 12 bit data format including one bit used for a movement code.

FIG. 13 shows an arrangement for inserting the generated movement code into picture data to allow the code to be used in the adaptive output volume processor.

FIG. 31 shows an alternative system in which the input and output processors, noise reduction system and store are provided as an integrated system which can be computer controlled.

FIG. 32 shows the basic processing function using the system of FIG. 31.

FIG. 34 shows an arrangement for effecting the distributed store and processor of FIG. 31.

DESCRIPTION OF PREFERRED EMBODIMENTS

Figure 2B:
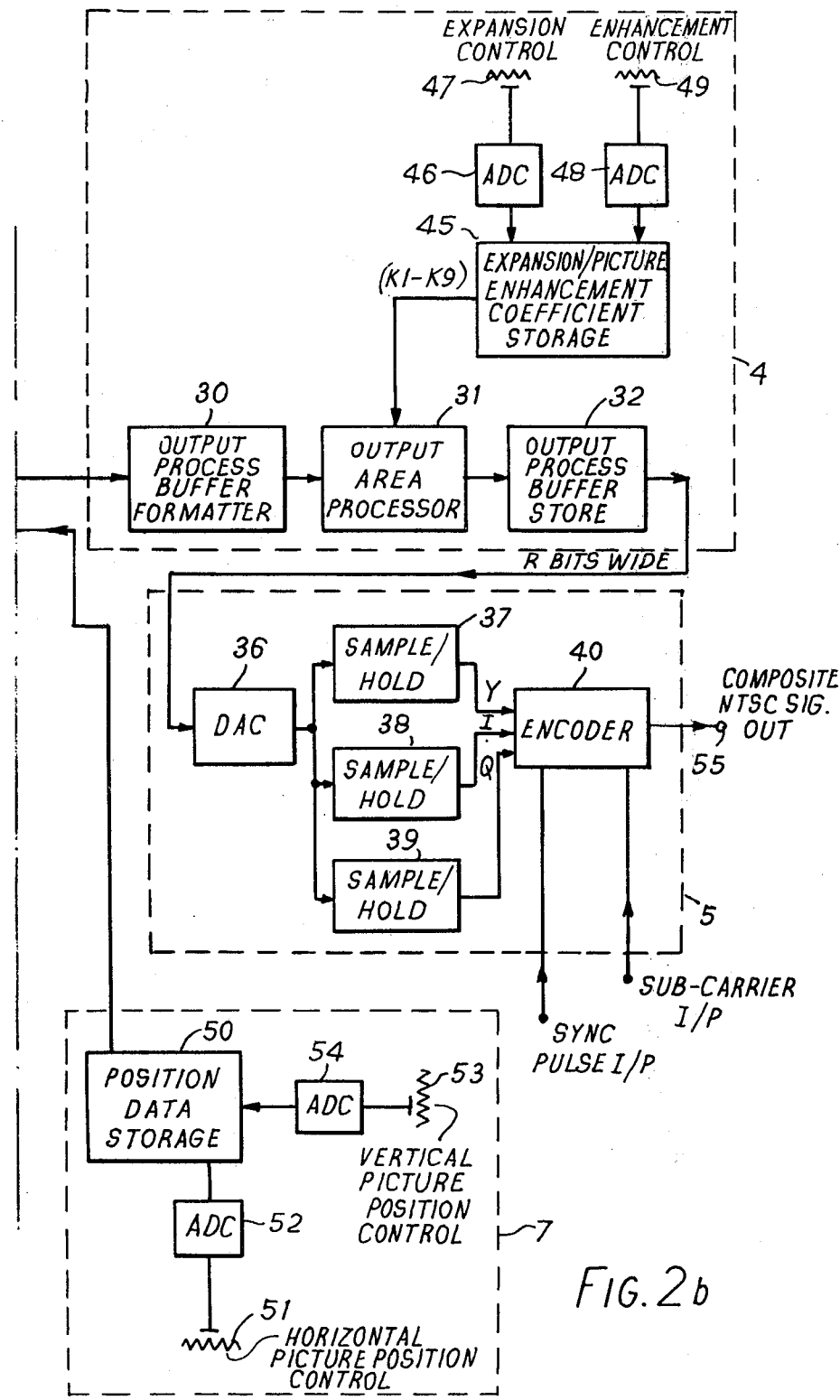
FIG. 2 shows an embodiment for producing the system of FIG. 1.

The processing system of FIG. 1 shows an input receiving unit 1 which receives an incoming T.V. signal (e.g. NTSC 525 line standard). This input unit 1 will modify the incoming signal as necessary to a format acceptable to the compression/expansion unit 2. Thus if the signal is normal composite video, the chrominance and luminance components will be separated and the analogue information converted into digital form for application to the compression/expansion unit 2. Such analogue to digital conversion of T.V. signals is well known. For compression, the unit 2 will take the digital data corresponding to incoming picture point information and derive a reduced number of picture points for a given picture size so that the reduced size picture from the system output will be produced in real time derived from the incoming data. For expansion, unit 2 will modify the incoming picture information so as to derive a larger number of picture points than originally present for a given picture size so that at the system output an expanded picture based on the original data will be produced in real time.

The modified data from unit 2 will be temporarily stored in digital store 3 prior to read out (e.g. for 1 frame period). A compression/expansion unit 4 may also be provided at the output of store 3. Thus the unit 2 could conveniently be used for compression and unit 4 for expansion. The amount of compression or expansion can be variable if required so that the zoom down or zoom up can be provided in real time. The modified picture data is received by output receiving unit 5 which will convert the data into analogue form and effect the known output processing functions to provide an analogue composite T.V. signal at output 55. The data in store 3 is accessible to allow modification by coefficient generator unit 6. The generator unit 6 produces coefficients to modify the stored data so as to provide an enhanced picture at the system output.

In the general case where the compression/expansion is variable the coefficient generation unit 6 will effect noise reduction on the data. If the amount of compression or expansion is fixed as in the case of standards conversion i.e. 625 to 525 lines (compression) or 525 to 625 lines (expansion) then the coefficients generator is used to provide movement interpolation coefficients which is explained in greater detail below.

In addition to compression and expansion, a position control unit 7 may be provided to vary the relative position of the picture on the normal T.V. frame so that for example a reduced picture may be moved from a central position to one corner of the screen.

An embodiment for producing the desired functions of the system of FIG. 1 is shown in block diagram form in FIG. 2. The system of FIG. 2 is described for producing variable compression and expansion and the coefficient generator 6 connected to the store is used to provide noise reduction coefficients. Compression/expansion unit 2 is used for compression and unit 4 is used specifically for expansion. It will be understood that these functions can be interchanged.

The FIG. 2 arrangement is described for use with NTSC line standard but could be adapted to other standards.

The input composite television signal comprising chrominance and luminance information is applied to input 10 of input receiving unit 1 having a decoder 11 therein which produces separate signals for luminance and the colour difference signals. Luminance is designated Y whilst the two colour difference signals are categorised as I and Q. The luminance signal has a bandwidth of 4.2 MHz whilst the colour difference signals I and Q each have a bandwidth less than 1 MHz.

The Y, I Q signals are applied to an analogue multiplexer 12 which looks at each of them on a time shared basis such that the sampling frequency is sufficient to convey all of the information. A typical sampling frequency for Y will be 10.7 MHz and for I and Q 3.58 MHz. The time sharing may be arranged in any sequence so that the sampling frequency is maintained above the minimum required by information theory. The minimum frequency which may be used in this system is twice the maximum bandwidth required at the output of the system for Y, I and Q.

The analogue multiplexer produces a time shared serial analogue data stream which is applied to a sample-hold unit 13 which stores the information presented sufficiently long for an analogue to digital conversion to take place in ADC 14.

The analogue to digital conversion produces a digital data stream M bits wide. In the system described herein M lies between 8 and 10 bits. 8 bits is sufficient to convey all analogue input information without significant signal degradation. The output from the ADC of input unit 1 is applied to the compression unit 2.

The 8 bit wide digital data is applied to a process input formatter 15 within compression unit 2 which formatter accepts the digital data stream in the order presented, stores it and represents it so that the input area processor 16 may operate on the signal.

The input processor 16 is an area processing operation which accepts a number of picture points from adjacent lines horizontally and adjacent points vertically. A co-efficient (described in detail below) is applied to each of the input points and the resultant output is a single data word for each new picture point which is the sum of various proportions of the input data points over the area being processed. The required compression coefficients are stored in a coefficient store 26 and the degree of compression can be controlled by compression control 28 via ADC 27.

The input processor buffer store 17 accepts data from the input processor 16 at the rate presented and re-formats it for subsequent storage in the main store 3 via the noise reduction system 6. The noise reduction input co-efficient modifier 18 of system 6 accepts the digital data stream and modifies it by a factor designated K11. The output from co-efficient modifier 18 is applied to one input of an M bit wide adder 19. The output of the adder 19 is Q bits wide and applied to co-efficient modifier 20 which accepts the input from the adder, modifies it by a coefficient K13 and provides the output Q bits wide available for the input port 1 of data store 22 within store unit 3.

Port 2 of data store 22 is arranged to read data from the data store and apply it to co-efficient modifier 23. Modifier 23 accepts the information from the data store, modifies it by co-efficient K12 and applies it to the other side of the Q bits wide adder 19.

The co-efficients K11, K12 and K13 are set by the set co-efficients unit 25 which examines data from the input process buffer store 17 and from the output port 2 of data store 22 in an area comparison system. The result of the area comparison information modifies the co-efficients on a point by point basis in real time. The noise reduction data is stored in noise reduction store 41. Noise reduction can be controlled by control 43 via ADC 42.

Port 3 from the digital data store 22 produces data R bits wide and applies it to the output processor buffer formatter 30 of expansion unit 4. The formatter 30 accepts the output from port 3 and modifies it for processing in the output processor unit 31. This modification is a simple re-arrangement of the data necessary for use in the output processor.

The output processor 31 operates as an area processing function in a similar way to the input processor. The output processor accepts data from a number of adjacent lines horizontally and a number of adjacent picture points vertically. Each of the picture points are modified by a co-efficient described below and the resultant output data R bits wide is available for application to the output processor buffer store 32.

The co-efficients for expansion are stored in store 45, and the degree of expansion can be controlled by control 47 via ADC 46. Enhancement can also be provided by control 49 via ADC 48 and is described in more detail below.

The output process buffer store 32 takes the information from the output processor function and modifies it for application to the digital to analogue converter 36 of output receiving unit 5. The modification is a simple re-arrangement and re-timing of the output information such that it appears in the time scale necessary for handling by the digital to analogue converter(DAC).

The DAC 36 accepts data R bits wide and produces an analogue output which is a true representation of the digital number presented to the input.

The analogue output is applied to three sample-hold units 37, 38, 39, one of which is each allocated for Y, I and Q. The resultant analogue outputs Y, I and Q are then applied to an encoder 40 to reproduce a composite NTSC television signal output.

In the system under consideration the resolution of the data store is Q bits wide where Q lies between 10 and 12.

The output data from port 3 of the data store 22 is R bits wide where R lies between 8 and 10. The system is capable of operating without any signal degradation at 8 bits wide and signal enhancement may be utilised so that 10 bit data is available to provide a significant noise reduction.

The system of FIG. 2 will now be described more fully. The input de-coder 11 is a standard television equipment which accepts a composite T.V. waveform, filters it to exclude the chrominance information carried on the sub-carrier of 3.58 MHz and coherently detects the I and Q components. The YIQ output is filtered to provide full bandwidth signals on each of the three channels.

The analogue input multiplexer 12 is a simple known analogue switch operating at high speed. A bridge diode switch has proved one way of producing an analogue multiplexer capable of operating at the speeds required which are in the region of 15 MHz between switch points.

The analogue sample-hold unit 13 before the ADC comprises a high speed bridge diode switch and memory capacitor which retains the stored charge sufficiently long (66 nanoseconds)for the analogue to digital conversion to take place.

The analogue to digital converter 14 is of known construction and can be of a form described in British patent application 26613/74 (U.S. Pat. No. 4,005,410). The basic analogue to digital conversion produces parallel digital data 8 bits wide for application to the input process buffer formatter. The sequence of data from the ADC corresponds to the time shared operation of the analogue multiplexer and may for example be in the form YYI, YYQ. In the form described the input area processor requires a format YYY, YYY, III, YYY, YYY, QQQ. The processor input buffer formatter 15 accepts the data as presented by the ADC and reformats it for application to the input processor. It is simply a buffer store operating at approximately 15 MHz (e.g. 1 line stores of 1024 locations).

The input processor 16 operates in the area processing mode. FIG. 3 shows the function of the input area processor. Successive picture points P1 to P9 on adjacent lines N, N+1 and N+2 are applied to the input processor. Each of the points P1 through P9 is modified by co-efficient K1 through K9. The resultant sum is a new picture point designated NP1 where $$NP1 = K1P1 + K2P2 + K3P3 \ldots \text{etc. through } K9P9.$$

If the input area processor function is operating to reduce the picture size for compressed pictures the output data may appear more slowly than the input data. Thus for compression, the number of new picture points produced will be less than the original number of picture points but each new picture point will be derived from data on the nearest 9 picture points. How the processor effects this function will now be described.

In order to reduce the size of a standard television picture interpolation is needed across the picture area. In the system described the total television picture is broken up into a number of picture points. The picture could typically be broken into 512 picture points per line for a 525 line picture. As already described with reference to FIG. 3, the area process function is effected for new picture point NP1 by the expression $$NP1 = K1\ P1 + K2\ P2 + \ldots K9\ P9.$$

This area is designated Area A in FIG. 4. When calculating the next picture point NP2 (say) the values of coefficients K1 to K9 for Area B will be different to those for Area A thus $$NP1 = K1A\ P1 + K2A\ P2 + K3A\ P3 + \ldots K9A\ P9 \text{ and}$$

$$NP2 = K1B\ P2 + K2B\ P3 + K3B\ P10 + \ldots K9B\ P12.$$

Thus the input area process remains the same but the co-efficients K1 through K9 are variable.

The operation of area interpolation occurs in real time and as the data represents incoming information scanned horizontally the co-efficients K1 through K9 have to change across the length of 1 television line. In the system described the switch occurs between picture points.

In the same way vertically the boundaries between the lines represent co-efficient changes. Each new picture point is computed from information available from the nearest 9 picture points to that new picture point.

In order to switch co-efficients between the picture point boundaries horizontally excess look-up tables are provided within the basic system. However as it is possible to re-load data into the look-up tables when they are not in use it is possible to implement the system utilising only one complete set of excess look-up tables.

The co-efficients K1 through K9 are stored in a separate co-efficient storage unit 26. The required degree of compression is manually controlled by the analogue type control 28. The amount of compression is converted into a digital number in analogue to digital converter 27 and applied to the co-efficient store so that the required values of K1 through K9 are extracted for each setting of the compression control.

Figure 5:
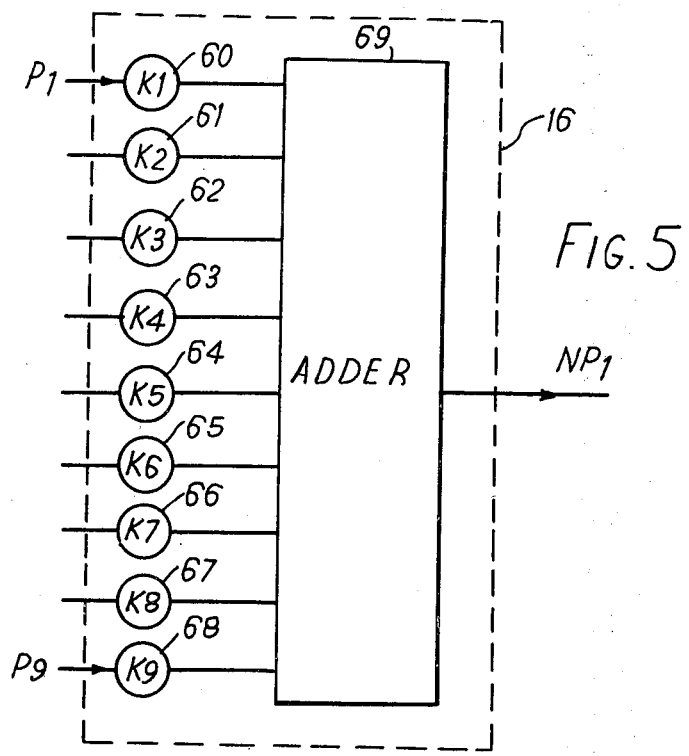
FIG. 5 shows the construction of the area processor including several multipliers.

The area processor 16 is shown in detail in FIG. 5. Multipliers 60–68 each receive data on one picture point (P1–P9) and multiply the data by co-efficients K1 to K9 respectively, which co-efficients will each be variable but preset. The modified data is added in adder 69 which comprises a 9 input ×8 bit adder. The output from adder 69 will be the new picture point NP1.

Figure 6:
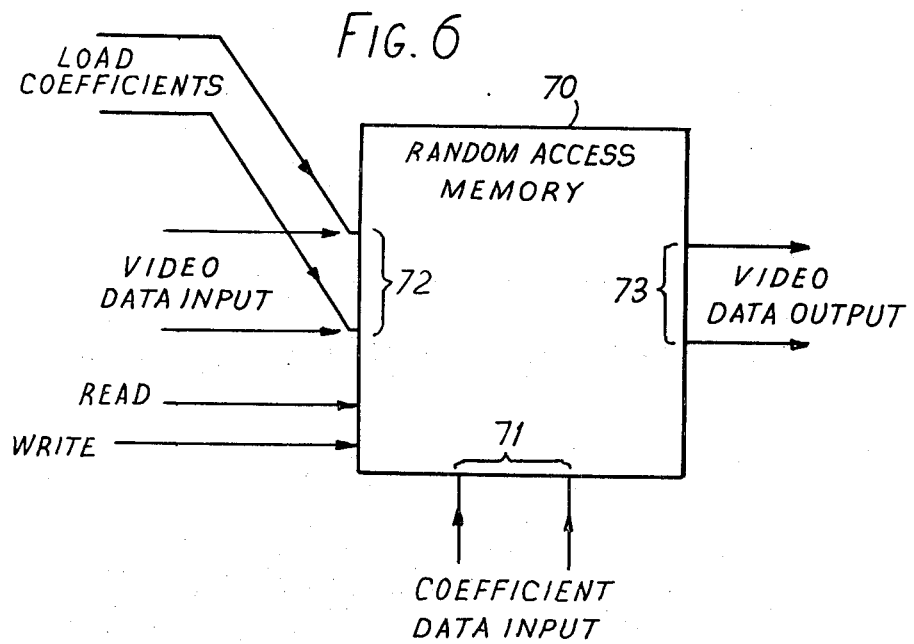
FIG. 6 shows random access memories used for the multipliers of FIG. 5.

The co-efficient multiplier function of area processor 16 (i.e. multipliers 60–68) can be effected by using random access memories (RAM), see FIG. 6. The RAM 70 shown is of 8×256 bit capacity and such memories and their mode of operation are well known in digital processing. The coefficients K1 to K9 are loaded into the store locations within the RAM during a write cycle. The co-efficient data from the co-efficient store 26 (of FIG. 2) is applied to the RAM data input 71 shown in FIG. 6. The location to which data is written in is determined by store address data input 72. Address data is applied in the normal way to the address input 72 to input the co-efficient data at input 71. The addressing data is shown as 'load co-efficients'. During operation as a multiplier (i.e. read cycle) the incoming video data is applied to the RAM 'address' terminals 72. The RAM has sufficient addresses so that each input number identifies one particular location within the store. Thus as each location has a preloaded co-efficient stored therein when a particular location is accessed (i.e. in dependance on the incoming data which effectively defines the address), the data stored in a particular location is read out from the RAM at output 73. This data will either be an 0 or I depending on the predetermined co-efficient. Thus the 8 bit input data for picture point P1 will effectively be multiplied by a coefficient K1.

The input processor buffer store 17 accepts the data produced by the input area processor 16 and stores it ready for input to the data store. It is simply a buffer store operating at a maximum of 15 MHz and a figure which may be lower in the case of compressed pictures.

Co-efficient modifier 18 includes a multiplier operating in real time. In this system there are a number of multipliers and a basic requirement is the ability to multiply at high speed. The method used is a look-up table and is applicable in all the co-efficients (see explanation above in relation to the multipliers of area processor 16). The input data from buffer 17 is applied to a RAM within modifier 18 which has sufficient addresses so that each input number identifies one particular location in the store. As explained above the video data is applied to the terminals usually known as the 'address' terminals. At the location identified by the data either a 0 or a 1 is stored and read onto the data output. The co-efficient K11 is pre-determined and pre-stored as a series of 0's and I's in the locations within the RAM (e.g. 8×256 bit).

As for the RAM of the processor 16, in order to load the co-efficients the co-efficient data is applied to the terminals marked co-efficient data input and the addresses are multiplexed to the load co-efficients.

Once the co-efficients have been loaded the address terminals are connected to the data input and the RAM store is operated in the read mode.

The output from co-efficient modifier 18 is applied to one side of an M bit × Q bit wide adder. Standard arithemetic elements are used for the adder 19.

Co-efficient modifier 20 takes the form of a look-up system as described above, the output being applied to the data store.

Co-efficient modifer 23 also takes the form of a look-up system.

Co-efficients K11, K12 and K13 are set in the set co-efficients unit 25. The operation of this block is basically to look at the output data over a small area and compare it with the new input data which is appropriate for the same area. The co-efficients are modified depending upon the amount of difference which exists between the data. Preset co-efficients K11, K12 and K13 determine the amount of varying degrees of noise reduction which may be applied to the system. The output from analogue noise reduction control 43 is applied to analogue to digital converter 42 which is connected to the noise reduction data store 41. The general principle of noise reduction is in the form of a re-circulating digital number to which a proportion of the new input information is added and a proportion of the total removed at each store location within store 22. The system may be likened to an integrator with leakage. Picture information in the television system contains a large amount of stationary data during which high noise reduction co-efficients may be applied. The nature of the noise may be random and the larger the integration time in the data store, the greater the reduction in noise.

Co-efficient K12 controls the amount of output data fed back and re-stored.

Co-efficient K13 controls the amount of data which is removed during each store cycle. Co-efficient K11 is provided to prevent the system overflowing and exceeding the store capacity.

The amount of noise reduction effected as explained above is dependent on the co-efficients K11, 12, 13. The noise reduction control in principle alters the amount of integration applied. For static picture information (e.g. T.V. test card) it is readily apparent that the amount of picture feedback (as determined by co-efficient K12) can be high since the next frame will be identical to the previous frame. Thus values for the co-efficients during static information may be K11=0.1; K12=0.9; K13=0.95.

In the case when the T.V. picture is not static, (e.g. when scene movement is occuring) to prevent distortion to the noise reduced picture it is necessary to have a shorter integration period; the faster the movement the shorter the allowable integration time. Thus the values of co-efficients K11, K12 and K13 will have to be adjusted accordingly. Typically for high movement the co-efficient values could be $$K11=1.0; K12=0; K13=1.0.$$

The data store 22 has three data ports 1, 2 and 3. Port 1 allows data to be written into the store, port 2 allows data to be read from the store at a location corresponding to port 1 and port 3 allows data to be read from the store at another location. In principle the three ports run asynchronously. The data store may take the form of a system described in British patent application No. 6585/76 (U.S. patent application Ser. No. 764,148). The store is large enough to store at least one complete television frame of Y, I and Q information at full bandwidth (5-6 M Bits).

The store 3 has an associated store control which includes address counters for addressing the various memory addresses within the frame store for a read or write cycle and timing control for producing timing signals for addressing the memory elements at the correct point in time, in known manner and as explained in detail in the above referenced Patent Application. The store itself is constructed from known 64×64 bit memory chips (i.e. 4096 by 1 bit RAM) which bit locations are accessed by entering row and column address information from the store control as an 18 bit address derived from picture point counters. As the 4096 random access memory chip is dynamic, a refresh cycle must also be effected to retain the stored data. Refresh address counters are therefore included. For example, a store using 16 cards each containing 32 RAM chips would provide a framestore of 256×512 words 8 bits wide to allow 512 video lines each of 512 picture points to be stored.

The storage capacity could be expanded as required.

Port 3 provides digital data to the output processor buffer formatter 30. The output area processor 31 is similar in concept to the input processor but operates with R bits wide data instead of M bits wide data. R is equal to or greater than M for picture noise reduction.

The limit to the noise reduction which is not limited by systematic errors is dependent on the capacity of the data store. In the system under discussion, with suitable storage, 16 complete frames of information may be stored and integrated before the store overflows using:
M=8
Q=12

At this level of integration a reasonable value for R is:
R=10

The output area processor 31 is similar in concept to the input area processor accepting inputs from adjacent lines and adjacent points. Co-efficients are applied using the look-up system and the resultant output information is stored in the output processor buffer store 32.

The output processing system allows the image to be enlarged. Information from the part of the store being accessed is read into the output process buffer 30 and processed using co-efficients for K1 through K9 stored in the co-efficient storage for expansion unit 45. The amount of expansion required is controlled by the expansion control 47. The analogue to digital convertor 46 enables the values for K1 through K9 on the output area processor to be withdrawn from the co-efficient store 45. The implementation of the output area processor is similar in every respect to the input area processor. In principle the output area processor may be used for compressed pictures as well as enlarged pictures. The only difference is in the values of the co-efficients required.

In addition to the basic expansion function, picture enhancement can be effected. Picture enhancement is generally concerned with improvements in edge effects. In the television system this is called horizontal and vertical aperture correction. The output area processor enables both horizontal and vertical aperture correction to be undertaken by selecting appropriate co-efficients for K1 through K9. Enhancement control 49 is connected to the store 45 via ADC 48 and operates in similar manner to the expansion control.

The area processed digital data is passed to the output process buffer store 32 which buffer applies this digital data to the digital to analogue converter 36 which converts the digital number to an analogue representation. The DAC may be of the form described in British patent application 25721/73 (U.S. Pat. No. 472,059).

The three sample-hold units 37, 38, 39 are used to store the values of Y, I and Q in analogue form. The basic sample-hold unit is a diode switch and memory capacitor.

The encoder 40 is a standard piece of television equipment which accepts sync pulse inputs, sub-carrier inputs and Y, I and Q values. The inputs are combined to produce a standard composite NTSC T.V. signal output at the system output 55.

In the system which has been described 3 horizontal lines and 3 adjacent vertical points are processed as an area. There is no reason why a larger number of points cannot be used for very large magnifications and very large enhancements.

Similarly if only a small range of compression, enlargement and enhancement is required less than 9 points may be processed as an area.

There are clearly a number of points which will be considered in optimising the values of the co-efficients used in this system. One point which is worthy of mention is the ability of the system to be given a designated frequency response at sub-carrier. De-coding of television information into Y, I and Q does not always completely remove sub-carrier information. Residual subcarrier in this system may be removed by utilising particular values of the co-efficients.

Difficulties in producing a line by line de-coder which does not suffer from degradation is a limiting factor in the overall performance of the equipment. In this equipment a complete framestore is available and may be utilised to assist the decoding operation. The format of NTSC television signals is such that the phase of the sub-carrier is exactly 180° out on a frame by frame basis using the same reference picture point by adding together two successive frames the sub-carrier information may be reduced to zero. Utilisation of this principle in the de-coder assists in maintaining full luminance resolution horizontally and vertically.

By incorporating in the system a data store 22 which has totally asynchronous read and write ports, it is clear that this enables the whole equipment to be operated in environments with asynchronous television inputs. For example the equipment may be located in the studio and may be used to operate on a remote source which in no way is synchronized to the studio. The system then becomes a fully synchronizing T.V. picture processing system (see also British patent application No. 3731/76 and U.S. application Ser. No. 7,641,317).

The discussion of data compression and expansion has not so far covered which portion of the picture is to be used for display. The allocation of addresses in the data store for read or write operations may be offset by the position control unit 7. Information from the horizontal and vertical position controls 51, 53 allows information to be withdrawn from the position storage unit 50 via ADC 52, 54 and applied to the addresses being used in the main data store 22. Thus the store address counters within overall store unit 3 can be incremented/decremented so that picture data can effectively be shifted up/down and/or right left relative to the normal picture position. The compressed picture may be inserted at any part of the raster using the horizontal and vertical position controls. Similarly any part of the expanded picture may be examined using the same control when operating in the expanded picture mode.

The equipment has been described so far in terms of picture manipulation for pure compression about a central point and expansion about a central point. It is clear however that compression about any point or axis in the system may be undertaken by altering the co-efficients in the input area processor and output area processor. If for example the co-efficients are calculated in the normal way across the picture that is to say, co-efficients for the first picture point are different from those for the second picture point and different from the third, etc but that vertically all co-efficients remain the same then compression occurs about the centre line of the picture rather than the central point. This effect is called 'horizontal squeezing'.

With regard to the overall picture processing arrangements, intrinsic in the system is the capability of operating with video tape input signals. The design of the inherent store timing arrangements described in the aforementioned patent specifications are such that digital time base correction takes place on the incoming signal. The digital time base correction is the subject of other co-pending patents and will not be described in any detail. In this particular equipment the main requirement is the ability to utilise poor quality signals which generally record using a colour processing system known as 'heterodyne'. The output from such a system gives a stable chrominance signal with a time varying luminance signal. The input of this equipment as explained can accept such a signal.

As already mentioned the system described above may be used as a digital standards converter. Standards conversion generally involves re-arrangement of the television picture so that the outgoing television standard has a different field and line frequency to the incoming standard. For example, PAL to NTSC standards conversion will require taking an incoming line standard of 625 lines per frame and converting this to an outgoing standard of 525 lines per frame. Thus the number of lines is reduced and is comparable with a fixed amount of compression.

In addition to the reduced number of lines the number of fields per second will change. For European PAL the field rate is 50 fields/sec and NTSC used in USA is 60 fields/sec. The reduction in the number of lines is effected by the input area processor (area interpolation) and the increase in field rate can be accommodated due to the asynchronous nature of the frame store which allows different write in and read out rates. A proportion of the data from the old frame is combined with a proportion of the new frame using the 'leaking' integrator system i.e. co-efficients K11, 12, 13 as described above to produce smooth movement (movement interpolation) at different frame rates.

In addition, normal picture compression, enlargement and enhancement may also be effected.

The system described in FIG. 2 requires a storage of a large number of co-efficients. There are 9 variable co-efficients on the input processor, 9 variable co-efficients on the output processor and 3 variable co-efficients in the noise reduction mechanism. Each of the processing co-efficients is different for the various picture points and further each co-efficient is different for each size of compression or expansion. Noise and movement in the picture give rise to the need for variable co-efficients in the noise reduction system.

As already discussed, the co-efficients $K_{11}$, $K_{12}$ & $K_{13}$ have to be varied to take into account picture movement so as to avoid distortion. It is possible to detect such movement so as to vary co-efficient selection accordingly. This is effected by comparing data changes on the picture point information. For example, if each picture point in an incoming picture is subtracted from the data previously stored for the corresponding location for an earlier picture and if the difference signal exceeds a threshold level (e.g. using a comparator) then the picture is deemed to have moved and co-efficients $K_{11}$, $K_{12}$ and $K_{13}$ are switched to levels which would be appropriate for movement. Whilst any detected change remains within the threshold level, co-efficients suitable for noise reduction of still images are retained.

As a refinement to improve the system flexibility, one or more suitably programmed digital microprocessors could be used to calculate the required co-efficients.

In addition, they can be used to determine the address locations fixed in store and to calculate the interaction of the controls for compression, expansion, picture enhancement, noise reduction, horizontal position and vertical position with the store locations and hardware co-efficient look-up tables.

In the system described with relation to FIG. 2, the generation of a new picture point is effected by taking into account information from the surrounding picture points (i.e. area manipulation).

The basic requirement is the synthesis of a picture point which did not exist as a picture point on the incoming video data. The engineer aims at producing the best estimate of the likely value of a picture point by examining picture points around the synthesised picture point and either adding or subtracting various proportions of them to produce the best result.

Theoretical studies give a good guide to the values which might be chosen but in practice subjective viewing of the results has proved to be the only satisfactory way of generating a design. An improvement in the basic system of FIG. 2 has been achieved by using volume manipulation. Volume manipulation has been found to produce a better subjective result than area manipulation by itself. Volume manipulation adds another dimension to the matrix of picture points which may be used. Area manipulation used only horizontal and vertical dimensions. Volume manipulation uses horizontal, vertical and time dimensions. The synthesis of a new picture point using volume manipulation makes use not only of the adjacent picture points in the horizontal and vertical dimension of one picture but also of information coming from the next picture or series of pictures.

Figure 7:
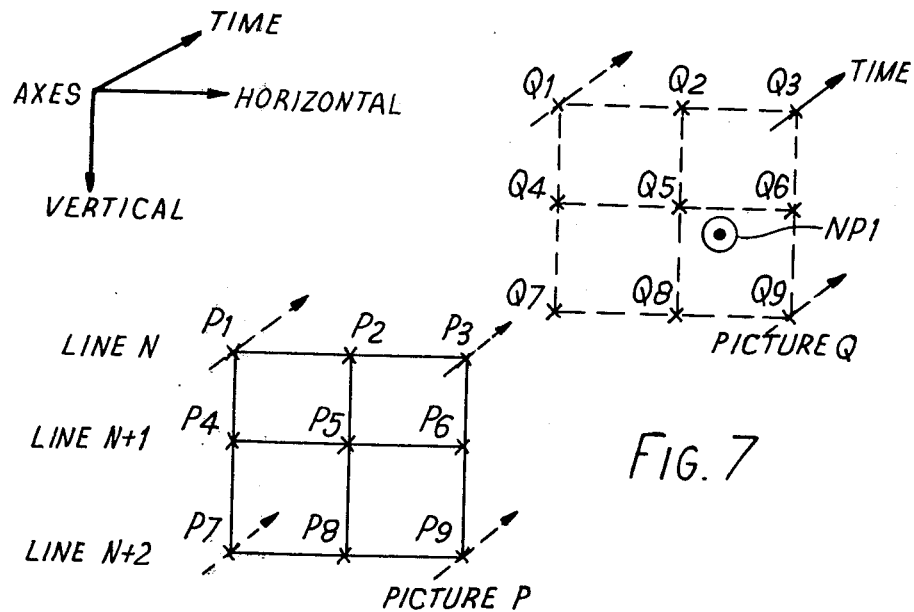
FIG. 7 shows the volume processing function used for the input and output processors.

FIG. 7 shows a 3×3×2 volume manipulation matrix. In each of two successive fields (successive pictures P and Q) 9 picture points P1 to P9 and Q1 to Q9 are defined. These 18 points are those closest to the new picture point NP1 to be synthesised together with picture points some little distance away. Thus P1 to P9 are the original picture points on picture P and Q to Q9 are the picture points on picture Q.

The new picture point is calculated from the expression below $$NP1 \times K1P1 + K2P2 + K3P3 + K4P4 + K5P5 + K6P6 + K7P7 + K8P8 + K9P9 + k1Q1 + k2Q2 + k3Q3 + k4Q4 + k5Q5 + k6Q6 + k7Q7 + k8Q8 + k9Q9.$$

The way in which the addition and multiplication is effected has been described with reference to FIGS. 5 & 6. The FIG. 5 arrangement would be expanded to handle the additional co-efficients and picture points.

Figure 8:
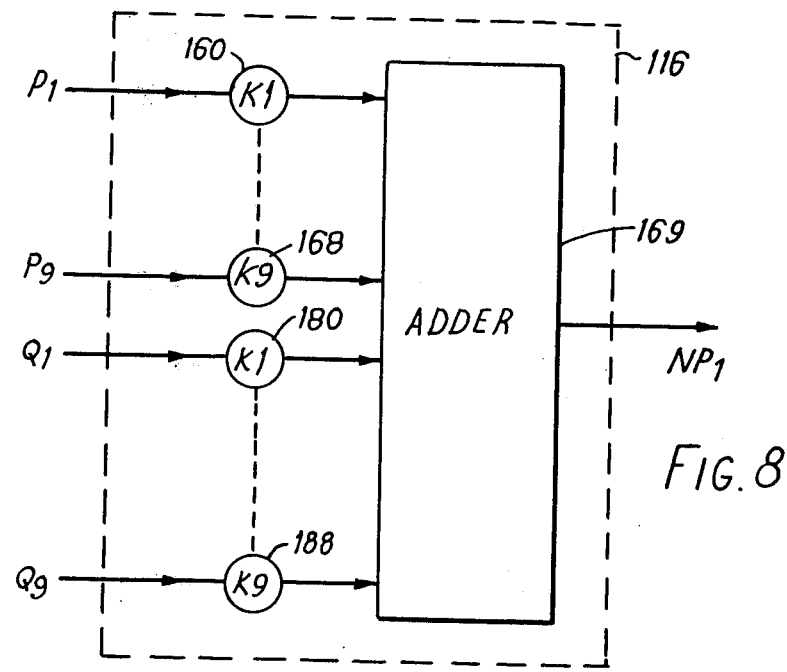
FIG. 8 shows the construction of a volume processor.

A circuit which could be used to implement the solution for NP1 is 18 separate real time multipliers feeding into an 18 input adder. Such an arrangement is shown in FIG. 8. Volume processor 116 comprises multipliers 160 to 168 for the picture points P1 to P9 and multipliers 180 to 188 for picture points Q1 to Q9. The multiplier outputs are connected to adder 169. Serial operation of some multipliers and adders may be utilised or a combination of serial-parallel adding and multiplication may be used. As already described the volume manipulation is used to enlarge or reduce the size of the television picture. Utilisation of this principle produces imperceptible picture degradation over a very large picture size change. The principle has been used to produce a digital standards converter capable of changing the picture size from 525 to 625 line standard or 625 to 525 line standards. The principle has been used to produce a production tool for television producers capable of expanding the picture from normal television raster size to the equivalent of a magnification between 3 and 10 times real size. The same piece of equipment is capable of reducing the picture size from normal raster size to effectively zero size.

The volume manipulation principle described above produces imperceptible degradation if the scene being viewed remains stationary or near so. Moving scenes can cause errors in the solution to the synthesised picture point. A technique for preventing degradation is to utilise 'adaptive' volume manipulation.

Simple volume manipulation utilises approximately the same amount of information from both picture P and picture Q. The percentage utilised from each picture varies over the screen and depends upon the magnification or size reduction operating at any time. K1 to K9 and k1 to k9 are caused to vary depending upon the magnification or size reduction demanded. This mode of operation is generally similar to the area manipulation of FIG. 2 except that picture points from picture Q are included.

'Adaptive' volume manipulation reduces the proportion of picture P utilised to generate the synthesised picture point in P1. K1 to K9 are reduced to a low value and k1 to k9 are increased in value under conditions when picture degradation would be caused (ie a greater proportion of picture Q is used).

Volume manipulation minimises the picture degradation by giving the processor access to incoming picture points which are as close as possible to the synthesised picture point being generated. The principle potential for degradation occurs when a scene changes between picture P and picture Q. Such a change may be caused by movement and generally all changes are ascribed to this cause whatever their actual source—for example noise on the signal will give a signal change which can be mistaken for picture movement.

In an earlier part of the specification reference is made to movement detection. In the system described movement detection is determined by measuring the change which has occurred between one successive picture point and the next. A threshold level is ascribed to the difference between the two levels and movement is determined to have taken place when the threshold is exceeded in either direction.

The adaptive volume processor system is given access to the movement detector and utilises the information to change the co-efficients of K1 to K9 and k1 to k9 as described above. FIG. 9 shows this arrangement. New data is input to one input of the subtractor 201 of movement detector 200 and data from store 3 applied to the other input of subtractor 201. The difference signal is input to comparator 202 where it is compared with the threshold and when movement is detected the signal passes to co-efficient store 126 so that different values for the co-efficients are selected. The picture compression for volume processor 116 is effected by control 128 via ADC 127 as before. The processor output passes to the store as before via the noise reduction system 6. (Input and output buffering have been omitted for the sake of clarity).

The description above of adaptive volume manipulation has used 9 picture points in two successive pictures to provide a synthesis of the new picture point. Experiments have been made with various values for the number of picture points to be used and their allocation. A particular case exists when only a single line of information is used in picture P and two lines of information are used in picture Q. Such a special case of volume manipulation has been used for specific applications with a consequent reduction of the circuitry needed for implementation. In this case the vertical component of NPI is given by the equation $$(Vert)NP1 = k1Q1 + k4Q4 + K1P1$$

Values of k1, k4 and K1 are varied according to the picture size required and under the control of the movement detector. FIG. 10 shows only the computation of the vertical component of NP1.

Horizontal interpolation may be undertaken using real time multipliers. Another method of undertaking horizontal interpolation is to vary the clock frequency of the input and output to a store. In a simple example a line may be clocked into a line store at one speed and clocked out of the same store at a different speed. The effect is a horizontal expansion or contraction depending upon the relative speeds of the input and output clocks.

The principle has been utilised in conjunction with the special case of volume manipulation described above to provide a specific range of expansion and contraction. FIG. 11 shows an arrangement for horizontal expansion or contraction using variable write-/read clock frequencies. Picture data from frame store 22 is input to line stores 190, 191 and 192 at one input clock rate and read out at a different speed to multipliers 193, 194, 195 for co-efficients k1, k4 and K1 respectively. The multiplier outputs are connected to adder 196 to produce NP1. The combination of these two special cases shown in FIG. 10 and FIG. 11 reduces the requirements for circuit complexity considerably.

In the system just described with reference to FIG. 9 using adaptive volume manipulation at the input to the store, movement information is available to provide the adaptive control without any difficulty. The movement detector operates by comparing new incoming signal information with previously stored signal information. A threshold is determined and movement is identified when the threshold is exceeded in either direction.

In a system which utilises volume manipulation at any other point other than the input to the store the movement detection information is no longer available at the time the volume processing operation is undertaken. For example, if the volume manipulation occurs at the output to the store the processor does not have access to the information necessary to make the correct adaptive decision.

The arrangement now described allows movement information to be carried with other picture information so that adaptive volume manipulation can be effected at a point other than the input to a store. Basically, additional storage capacity in the main video store carries this information.

The store described in the basic system makes reference to a store capable of storing one complete frame of video information at a resolution of Q bits wide. In an earlier example Q is given the number 12 bits. In a practical system video data 8 bits wide is used at the input which allows reproduction of television video signals without perceptible degradation. The video store used for computation has been found in practice to operate satisfactorily with a width of 10 bits. The additional capacity between 8 bits at the input and 10 bits in the store is used to eliminate mathematical errors and to accommodate noise reduction processing.

As described above, the movement detector receives the incoming video signal and this is compared with the previously stored video signal and when a threshold level is exceeded a decision is made that movement has taken place. All effects which give rise to the threshold level being exceeded are ascribed to movement although they may come from other sources such as noise.

When the threshold level is exceeded an additional information bit is stored in the video together with the video signal. The store thus carries processed video information plus an additional coding bit which identifies that movement has taken place.

The system makes use of the coded video information to determine the adaptive control function to be applied in an adaptive volume processor.

Thus, in context with the original basic system description one bit of the 12 bit wide video store is allocated to movement coding. FIG. 12 shows one data format which may be used. The most significant 10 bits of information are ascribed to the signal whilst one of the spare bits (bit 12) is ascribed to movement coding.

This allows the system to carry movement information across the main video store for utilisation by other circuits which would not otherwise have access to the movement information.

In the description above a single bit has been ascribed to the task of identifying movement. It is however clearly possible that various types of movement may be coded by utilising more than one bit. For example, two bits may be allocated (i.e. bits 11 and 12) which provide a total of 4 movement categories. Such categories could be classified as no movement—small movement—large movement—noise.

FIG. 13 shows a block diagram of the relevant parts of the system incorporating the video store together with an adaptive volume processor at the store output. (The noise reduction system has been omitted for clarity). Incoming video data from previous processing circuits is applied to input of the main video store 22 and to the movement detector 200. The movement detector has a further input from the main video store which enables the detector to determine whether movement has taken place between successive pictures. The output from the movement detector (movement code) is a single bit of information which is stored in parallel with the video input data passed to the store utilising the format shown in FIG. 12.

The main video store output provides digital data to the adaptive volume processor 131. An additional input to the adaptive volume processor is the movement code which is extracted from each word coming from the main video store. Depending upon the movement code stored at the input a change in movement code at the output provides adaptive manipulation within the volume processor. As previously stated, the main video store input and output system may be entirely asynchronous.

The movement detection function will now be described with relation to the noise reduction system.

As previously described, the basic mechanism used for noise reduction is the digital integration of video data within a video framestore. The video data is modified by co-efficients k11, k12 and k13 so that a variable degree of noise reduction is obtained.

A conflict exists between the requirements for noise reduction in which the maximum integration time should be used and the requirement that the picture shall maintain movement portrayal without distortion. The latter—movement portrayal requires the minimum integration time. Thus it is desirable to provide an adaptive mechanism which is sufficiently intelligent to adjust the co-efficients for variable integration time depending upon picture content.

Figure 14:
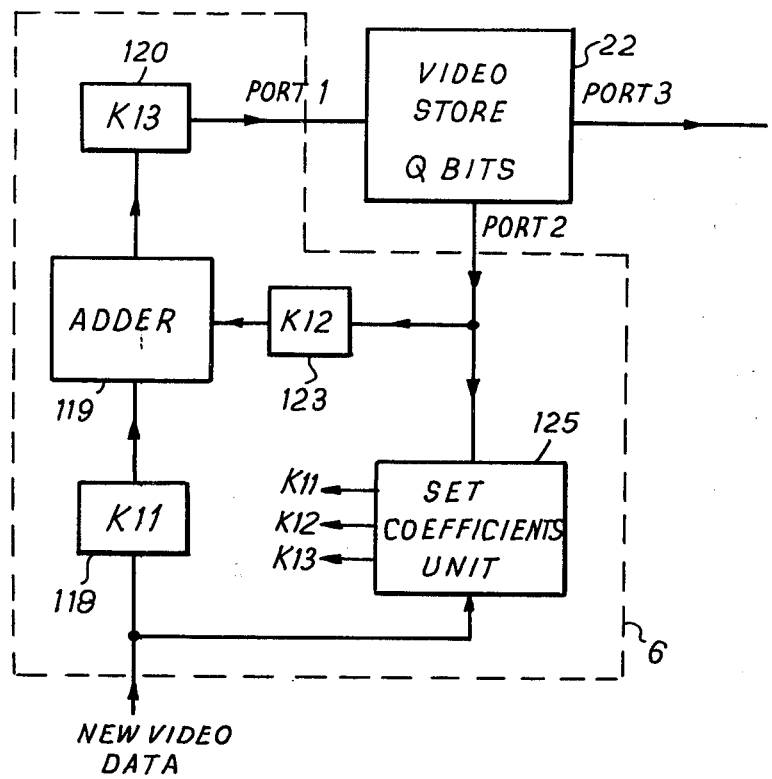
FIG. 14 shows the part of the processing system used for noise reduction.

FIG. 14 shows the basic noise reduction block diagram which has also been described with relation to FIG. 2. The signal paths are digital signal paths. Each of the signal paths carrying video data will be capable of carrying at least 8 bit wide video data operating at a clock rate typically 15 MHz.

New video data is applied to co-efficient modifer 118 for k11. Modifier 118 takes a proportion of the incoming video information and applies it to a digital adder 119. A second input to the digital adder is provided by previously stored video information after modification by co-efficient modifier 123 for k12.

The output from the digital adder is applied to co-efficient modifier 120 for k13 for application to the video store 22 at port 1.

As previously explained, port 1 is an input port to the digital framestore capable of carrying a full frame of television information where each storage location is wider than 8 bits. In a practical system a total of 12 bits may be used at each location in the video store. Such a video store would in practice have a capacity of approximately 6 megabits. The video store has a minimum of a single input port and a single output port. More typically the video store will have three ports, one of which is an input port whilst the second two are output ports. The arrangement of the store will enable the input and output to run non-synchronously with respect to television field and line rates. Port 2 will be capable of running synchronously with port 1 so that video data stored at the same picture location from a previous field may be accessed at the same time as new information for the same picture point is available in the next field.

Thus access to the top left hand picture element of field 1 is available from port 2 at the same time that the top left hand element of field 3 is available on the new video data input.

If the incoming video information is stationery—for example a test card transmission—co-efficients k11, k12 and k13 may be set to a value for optimum noise reduction. Typical examples of the co-efficients under these conditions are:

$k11 = 0.125$
$k12 = 0.875$
$k13 = 1.0$

If the total picture is moving, for example during the "pan" of a camera then the co-efficients k11, k12 and k13 may require setting at values shown below if movement portrayal is not to be distorted by the effect of the noise reduction system. Typical co-efficients under camerapan operations are:

$k11 = 0.875$
$k12 = 0.125$
$k13 = 1.0$

During the above two examples it would be possible to take an overall picture level movement measurement and apply that to fix the co-efficients k11, k12 and k13 for the total frame period. If part of the picture is stationary whilst part remains moving in order to obtain effective noise reduction over the stationary part of the picture whilst allowing movement portrayal without distortion, it becomes necessary to modify k11, k12 and k13 on a picture point by picture point basis.

The simplest step described above requires a setting of the co-efficients k11, k12 and k13 on a fixed basis. The first step towards a more effective co-efficient modification system which adapts to picture movement is the comparison of changes which have occurred between successive data values stored at the same picture location in sequential pictures.

Each picture point in a new picture is subtracted from the data previously stored at the same location and the difference signal is applied to a comparator. The movement detector 200 of FIG. 9 could be incorporated within set co-efficients unit 125 which receives new and previously stored picture data. If the difference signal exceeds a threshold level the picture is deemed to have moved and co-efficients k11, k12 and k13 are switched to levels which would be appropriate for movement. Whilst the change remains within the threshold level co-efficients suitable for noise reduction of still images are utilised.

Whilst such a system for the movement detector using a subtractor and comparator is adequate for the volume processor without the need to adjust the threshold level, when used for the noise reduction system it has been found that adjustment to threshold levels and co-efficient settings are required if the system is to operate satisfactorily.

Figure 15:
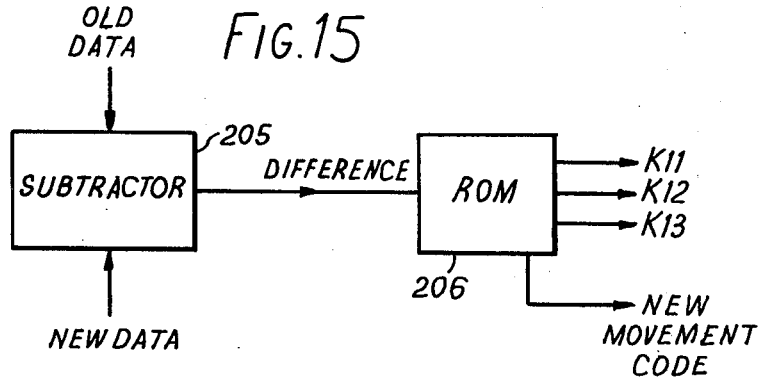
FIG. 15 shows an arrangement for multilevel co-efficient settings in dependence on movement detected.

To overcome this problem an alternative arrangement for the movement detector incorporated in set co-efficient unit 125 is shown in FIG. 15.

A read only memory (ROM) 206 is provided in place of the comparator and a subtractor 205 is used in a similar manner to the earlier arrangement. The mode of operation of a ROM and construction thereof is well known. The difference signal is now used to address read only memory which contains various co-efficients of k11, k12 and k13 in fixed storage locations. Large movements are differentiated from small movements and a sliding scale of co-efficients k11, k12 and k13 is provided on a real time basis. A movement code is available to be used by the volume processor as described above making the requirement of a separate movement detector for the volume processor unnecessary. The way in which this movement code is generated will be described below.

Figure 16:
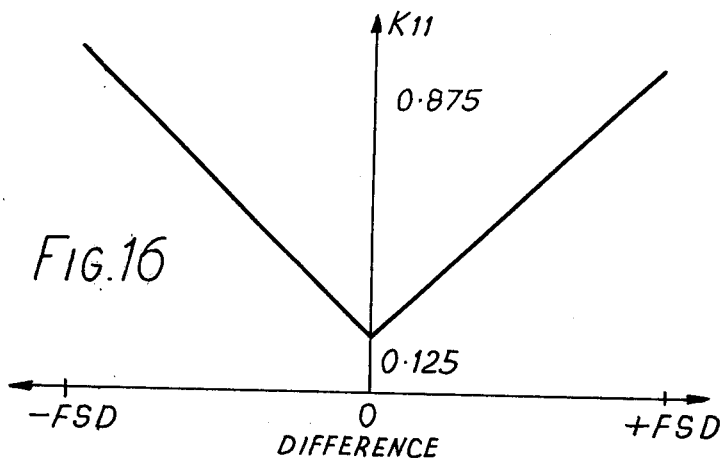
FIG. 16 shows a graph of stored co-efficients k11 which are selected in dependence of measured differences.

FIG. 16 shows a typical example of the co-efficient k11 as stored in ROM. The graph is shown against two axis. The difference signal is the horizontal axis whilst k11 is the vertical axis. If there is zero difference between old data and new data k11 is set to 0.125. If there is a full scale difference of either polarity between old data and new data k11 is set to 0.875.

Any value of the difference measured lying between zero and full scale will give a corresponding value of k11 from the graph.

Figure 17:
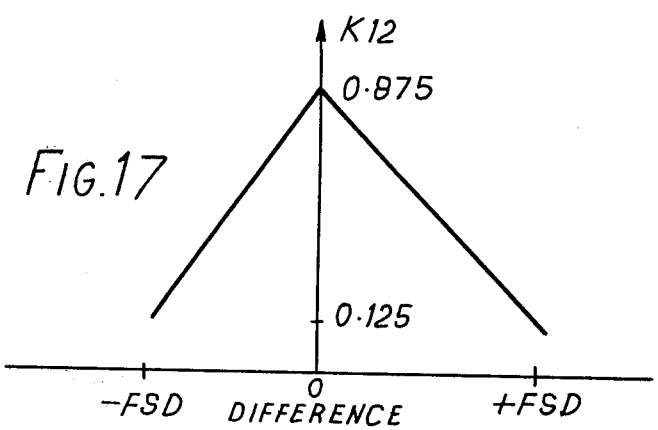
FIG. 17 shows a graph of co-efficients k12 stored in the ROM and accessed by the difference signal from the subtractor of FIG. 15.

The same difference signal produced by subtractor 205 is used within the ROM to calculate the value of k12 as shown in FIG. 17. If there is zero difference between old data and new data k12 is set to 0.875.

If there is a difference signal between old data and new data approaching full scale k12 is set to 0.125. Between the two extremes a sliding scale for values of k11 and k12 is chosen. The settings for k13 could be similarly effected.

Figure 18:
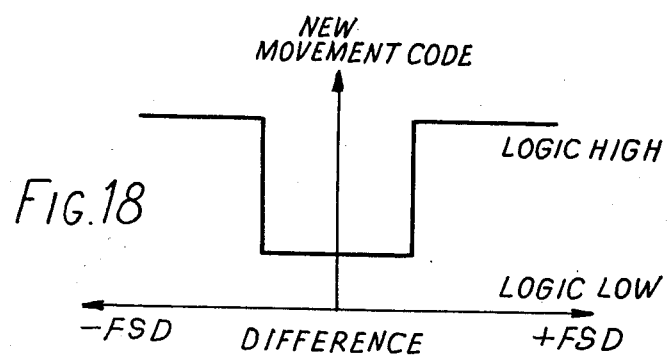
FIG. 18 shows an example of a suitable movement code provided at the ROM output of FIG. 15.

As mentioned concerning the ROM 206 of FIG. 15 the system provides movement information to the adaptive volume processor. This is provided by a single data bit available as a function of the difference signal and stored in the read only memory. FIG. 18 shows the movement code to be applied to the volume processor. The transfer function is similar to the simple comparator and threshold mechanism. Provided that the difference does not exceed a given threshold value the movement code remains at a logical low. If the difference signal exceeds the threshold value the movement code becomes logical high. No intermediate values are permitted between logical low and logical high. In practice it has been found that the threshold for movement coding may be set to a fixed level to cover all input signal variations.

The movement code bit derived from the mechanism just described is stored together with the video data in the store 22 as before. One of the bits in each location is allocated to storing the movement code to be later used by the adaptive volume processor.

Figure 19:
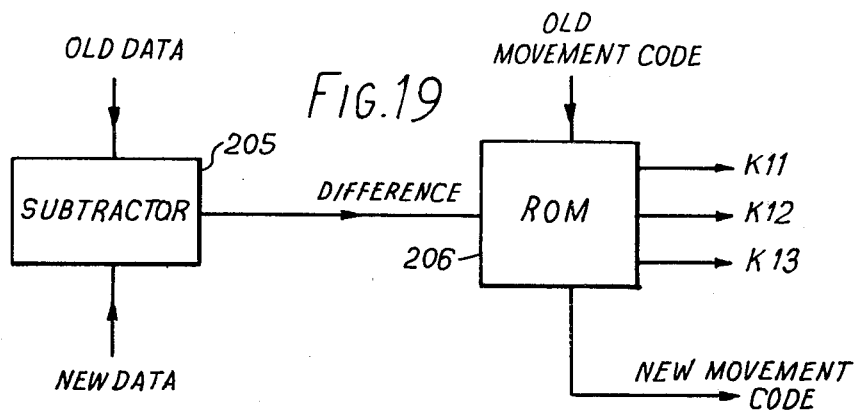
FIG. 19 shows an alternative co-efficient setting system using the movement code from previous data.

In addition to the use of the movement code in the volume processor the stored movement code may be utilised to provide more intelligent adaptive control of the noise reduction system. At the same time that the video data is retrieved from port 2 the old movement code is extracted and applied to the ROM. Two different co-efficient curves for k11 are stored in the ROM and are accessed in dependence upon the value of the old movement code. This ensures that the scene has been stationary for two frame periods before applying the heavier noise reduction co-efficients. Such an arrangement is shown in FIG. 19. ROM 206 receives the difference signal and the old movement code and produces the settings for k11, k12 and k13 together with the new movement code.

Figure 20:
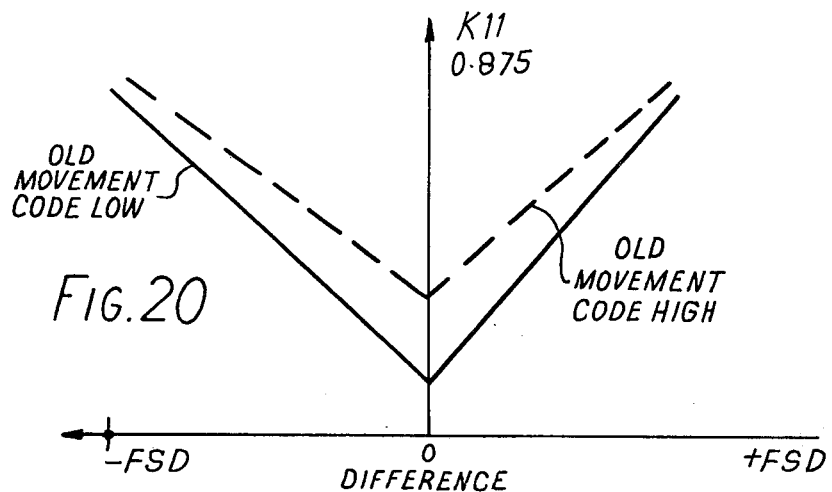
FIG. 20 shows a graph of co-efficient k11 stored in the ROM and modified by the previously stored movement code as well as the difference signal produced by the arrangement of FIG. 19.

FIG. 20 shows the two different curves for k11. The upper curve shows when old movement curve is high and the lower curve when the old movement curve is low. In a similar way curves are stored for two different co-efficients of k12 and k13.

The description so far is for an adaptive system which can change on a point to point basis and is generally controlled by a point to point comparison. As discussed earlier, a number of effects may give rise to a change in co-efficient and not all the effects are due to movement. For example, impulsive noise or tape recorder noise may also give rise to a different signal which is interpreted as movement. The descriptions which follow offer several mechanisms which distinguish between true movement and noise.

Figure 21:
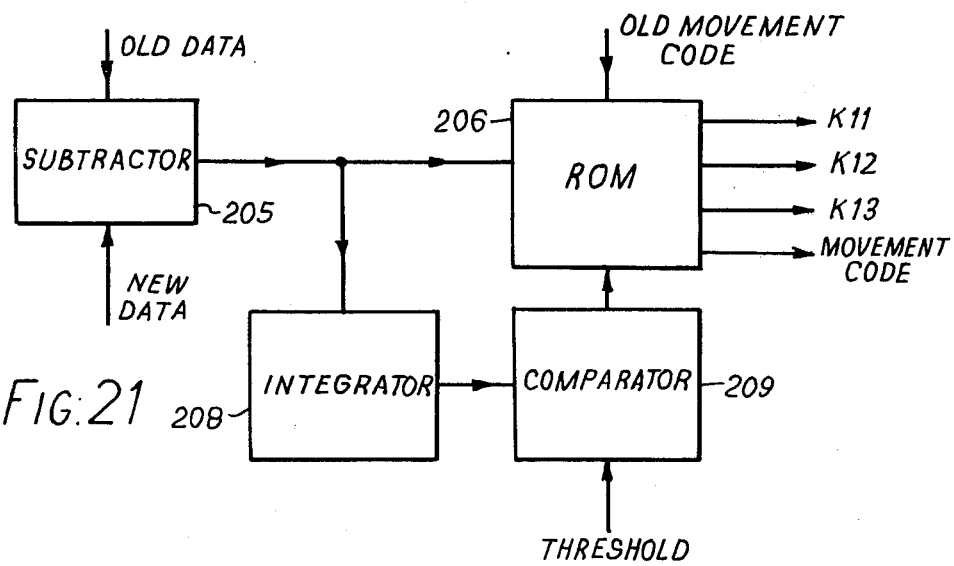
FIG. 21 shows a co-efficient setting using overall difference integration for detecting picture movement in the presence of noise.
Figure 22:
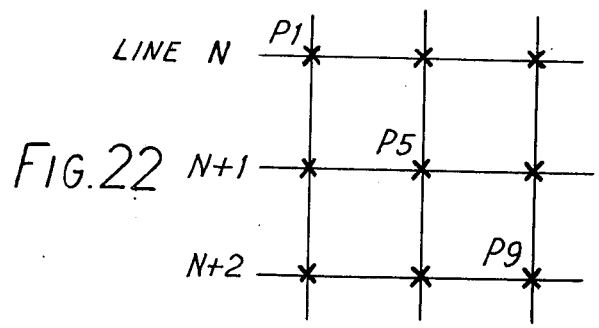
FIG. 22 shows the area voting system for movement detection in the presence of noise or residual subcarrier.

FIG. 21 shows a system which incorporates a digital integrator. The subtractor 205 accepts old and new data as before and the difference is passed to ROM 206. The old movement code is received by the ROM. An integrator 208 also receives the difference signal from subtractor 205 and the integrator output is received by a comparator 209 which compares this signal with a threshold level and the comparator output is connected to an input of the ROM. The integrator accepts the difference signal and produces an average value over a given period of time longer than a picture point interval. Provided that the noise is of a statistical nature, the digital integrator will generally sit with a value close to zero. Movement on the other hand will cause the integrator level to rise. The comparator and threshold system is applied to the output of the integrator and used to produce another signal which may be applied to the ROM. The ROM will have in addition to the two stored curves for k11 which are selected by the movement code described above, two further curves for k11 which are selected in dependence on the comparator output. The integration time may be selected as a part of a line, a full line, several lines or a complete field. In practice, a selection of several lines have been found to be a suitable value to differentiate effectively between true movement and noise. The subtraction between old video data and new video data has been described on a single picture point basis. It has been found however that a more effective method of determining the difference between noise and true movement may be made if an area of picture is examined. FIG. 22 shows the area examination system. In the example given 9 picture points are arranged in the form of a square with a single picture point in the centre. To determine the total difference at picture point P5 a contribution from all surrounding picture points is made. The system has a particular advantage in a colour television system utilising NTSC or PAL colour subcarrier. Utilising the arrangement shown for area movement detection the system may be made insensitive to residual subcarrier. The design of a decoding circuit to eliminate residual subcarrier is simplified if a scheme is utilised which is generally insensitive to the presence of residual sub-carrier components.

Figure 23:
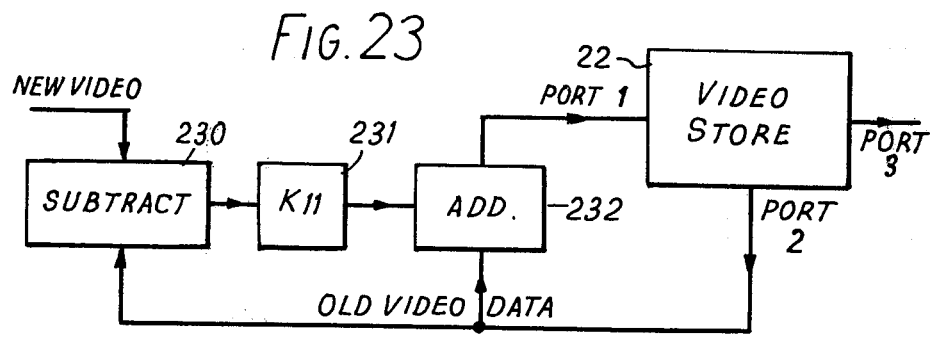
FIG. 23 shows an alternative arrangement for effecting noise reduction with a single multiplier function.

FIG. 23 shows an alternative method for implementing the noise reduction system which reduces the multiplier functions to a single unit. The implementation makes use of the general requirement that co-efficient k11 is equal to 1 minus co-efficient k12 for general purpose noise reduction, ie.

$$k11 = 1 - k12.$$

In this arrangement subtractor 230 receives the new video at one input and the previous video at a second input. The output is modified by co-efficient k11 in modifier 231. This output is passed to one input of adder 232 which adds this to the previous data from store 22.

So far the description has mainly related to the use of the co-efficients for noise reduction. Certain television systems require special video effects and the scheme outlined is capable of producing video effects by altering co-efficients k11, k12 and k13 to deliberately introduce 'distortion' in the signal. An effect of extreme camera lag may be synthesised by making k11 a low value irrespective of movement. The subjective effect is a blurr whenever a subject moves in the scene.

A further special effect may be produced by applying negative signs to the co-efficients. For example, it becomes possible to make objects disappear from view when they are stationary only to re-appear when movement takes place. The subjective effect is similar to an outline drawing of moving objects.

Digital standards conversion has been discussed above. A requirement exists in a digital standards converter to modify the co-efficients k11, k12 and k13 on a cyclic basis. The effect of using a cyclic variation may be utilised to provide 'movement interpolation'. The digital standards convertor requirement alters depending upon the type of scene under examination. Movement interpolation minimises distortion due to movement since standards conversion necessitates conversion from say 525 lines—60 fields per second (NTSC) to 625 lines—50 fields per second (PAL).

If an incoming picture having an incoming field rate of 60 fields per second carries a moving image, then successive pictures provide a general increment of the image moving from left to right on the screen. The outgoing pictures concerned with the outgoing fields are at 50 per second. In an ideal movement interpolator an image of the moving object provided on the outgoing picture would need to be provided in a position which is not depicted on the incoming fields.

Figure 24:
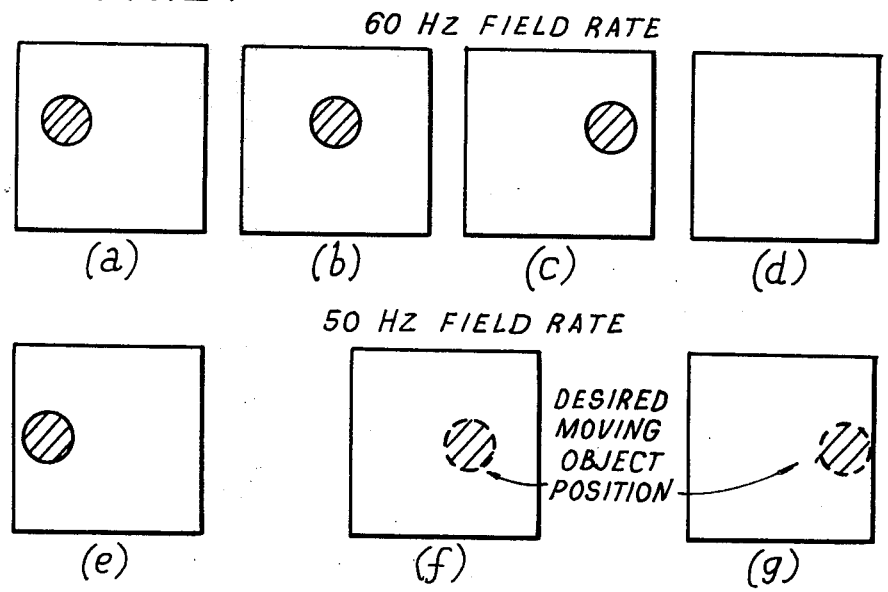
FIG. 24 shows the requirement of a 60 to 50 field rate movement interpolator for standards conversion.

Such a moving object is shown in FIG. 24. Successive pictures at 60 Hz field rate are shown at FIG. 23(a), (b), (c) and (d) and successive pictures at 50 Hz field rate are shown at (e), (f), and (g).

To implement a movement interpolator capable of reproducing the function described in the paragraph above requires that the system is sufficiently intelligent to recognise the outline in one field and measure the movement which has taken place in another field. Information could then be extracted which would enable an artificial image to be drawn in the correct position on an outgoing field. Such a process would be a true movement interpolator. However, current technology is not sufficiently advanced to enable engineers to implement such a design using any known techniques.

Subjective experiments have been undertaken which indicate that a reasonable simulation of movement interpolation may be implemented by utilising components from several fields in various proportions to artificially delude the viewer into believing he is seeing true movement interpolation.

The system of movement interpolation now described makes use of three different techniques to portray movement in the most acceptable subjective manner. The system is variable and adaptive. Techniques have been developed which enable the adaption system to be semi-automatic.

The three techniques utilised are categorised below:
(a) Field sequence interchange.
(b) Digital persistence.
(c) Digital cyclic persistence variation.

The three techniques are now described.

The incoming picture field sequence may be considered to start at a known position in time with respect to the outgoing picture field sequence. As the pictures arrive sequentially the error which occurs in the outgoing picture field sequence increases over a period of twelve incoming fields and ten outgoing fields in a 60 field to 50 field converter.

The assumption has been made in the above paragraph that the two different types of field (odd field and even field) cannot be interchanged in the sequence. The resultant discontinuous movement is clearly visible to the observer.

If the field sequence is changed so that an odd field is being displayed as an even field the amplitude of the discontinuity can be reduced by a factor of two.

The adaptive volume manipulator processor previously described is capable of accurately changing an odd field to an even field or an even field to an odd field without introducing distortion of the fixed and moving image. In this standards converter use is made of the adaptive volume manipulation to undertake a field sequence variation thus reducing the amplitude of the visible movement discontinuities.

Figure 25:
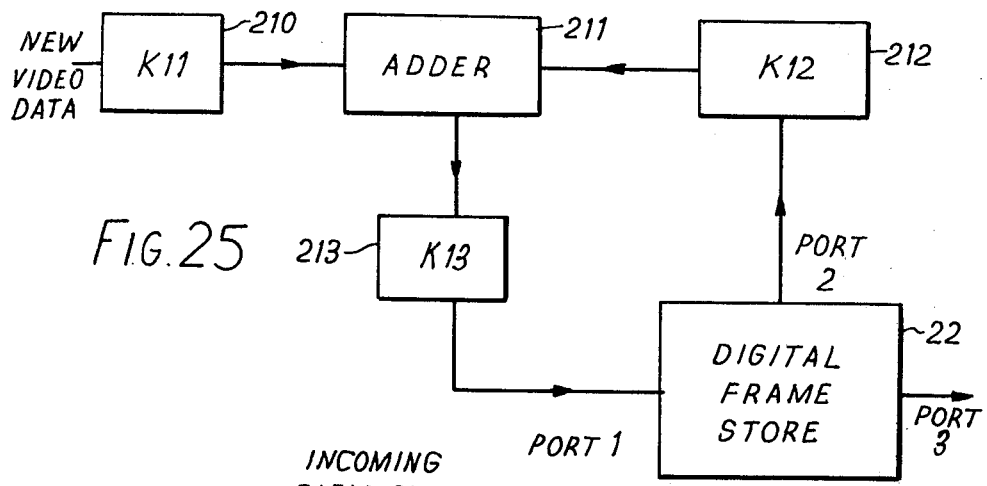
FIG. 25 shows an arrangement for effecting digital persistence in a standards converter.

An improvement to the subjective effect of movement discontinuity is provided by using digital persistance. A normal televison system has a small amount of residual memory due to the effect of phosphor decay. A controlled persistence is introduced in the standards converter by utilising the framestore memory together with co-efficients which control the persistence. The basic block diagram of the elements forming the digital persistence arrangement is shown in FIG. 25. This has similarities to the noise reduction arrangement, however, the co-efficients $k11$, $k12$ and $k13$ are different in this system.

The video data as before is modified in co-efficient modifier 210 by $k11$ and passed to adder 211 together with data from store 22 modified in modifier 212 by co-efficient $k12$. The adder output is modified by co-efficient $k13$ in modifier 213 and connected to the store input. Thus co-efficients $k11$, $k12$ and $k13$ dictate what proportion of the previously stored picture is added to the new picture available from the incoming data stream before re-storing in the memory. It is possible to arrange the system with only two ports but more typically three will be utilised. Port 1 is an input port allowing data to be entered into the framestore. Port 2 is an output port which may be considered synchronous with port 1 allowing information to be extracted from the memory. Port 3 is an asynchronous output port which allows the input and output system to be run at different speeds.

In the basic digital persistence system co-efficients $k11$, $k12$ and $k13$ are fixed. Typical values are shown below:

$k11 = 0.625$
$k12 = 0.375$
$k13 = 1.0$

The movement portrayal utilising digital persistence brings the subjective effect closer to the ideal. However, different viewers could choose different values for the co-efficients which suits them best. Variation of $k11$, $k12$ and $k13$ by a control function which may be accessible to the viewer will provide a means of selecting such values.

The effect of movement in a standards converter gives rise to a cyclic discontinuity. Major improvements to the subjective effect may be provided if the digital persistence is varied in a similar cyclic pattern. A typical cycle for $k11$ is shown below:

| Field | k11 |
|---|---|
| 1 | 0.5 |
| 2 | 0.625 |
| 3 | 0.75 |
| 4 | 0.875 |
| 5 | 1.0 |

The cycle repeats every 5 fields at the output. Once again subjective viewers may choose different values of k's to suit their own viewing requirements and provision is made to alter the value of k by a mechanism which may be available to the viewer.

Figure 26:
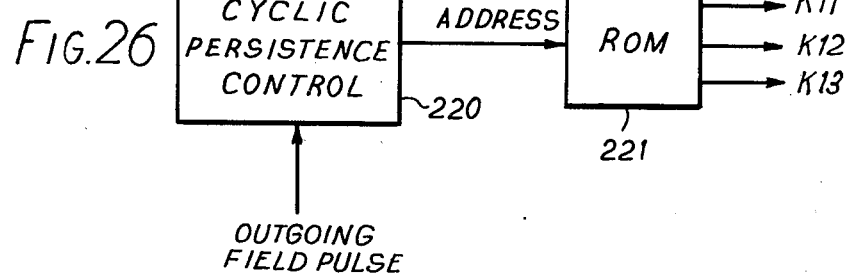
FIG. 26 shows a cyclic persistence control for selecting co-efficients in dependence on field pulses.

The way in which the cycle can be effected is shown in FIG. 26. A cyclic persistence control 220 incorporating address counters receives incoming field pulses and outgoing field pulses and provides an address as a result of the comparison. The address provided is used to look up $k11$, $k12$ and $k13$ in a read only memory (ROM) 221. The ROM has a number of co-efficients stored which may be accessed by the address. In addition the ROM has an input for varying the persistence control. The persistence control variation input selects a group of co-efficients stored in the ROM. If a single ROM is not large enough to accommodate all the co-efficients needed a number of ROM's may be simultaneously addressed and selected by the persistence control variation input.

Figure 27:
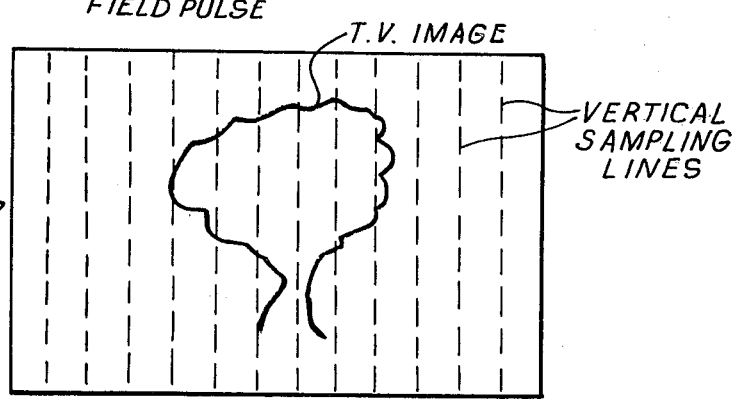
FIG. 27 shows a full screen image with vertical sampling lines for detecting camera panning for co-efficient modification.

Although viewers select the optimum value of digital persistence and digital cyclical persistence to suit their own requirements an overall tendency has been noted and utilised to produce an adaptive control system. During shots which involve camera 'panning' a higher value of persistence is generally chosen than when fixed camera shots are being displayed. Typical sports events involving following fast moving players involve panning shots whereas drama very often utilises fixed camera positions. A system has been devised to detect panning. The way in which the panning detector operates is shown in FIG. 27 for detecting horizontal and diagonal pans. A series of sampling points are arranged across the complete television raster. In the diagram shown vertical lines are chosen. The vertical lines are fixed against the television raster and in effect the picture moves behind the vertical lines. Whenever a camera pan takes place all of the vertical sampling points see movement occuring. The detection of movement at all of the vertical sampling points simultaneously indicates that a camera pan is occuring. On detection of panning the different co-efficients can be automatically selected to produce the best subjective effect whenever a large number of the vertical lines sees this movement. (This can also be useful for the noise reduction system above).

In the arrangement of FIG. 13 and the corresponding description the production of a movement coding bit is described which is used as bit 12 in the 12 bit width format, entered into the store to act as a readily identifiable code for any output circuits. The most significant 10 bits are used for the video data and one bit (bit 11) is spare.

In a 10 bit format with 8 bits of video data and the movement code bit being bit 10 then bit 9 would be the spare bit. A colour coding arrangement will now be described which makes use of this spare bit 9 (or 11).

Figure 28:
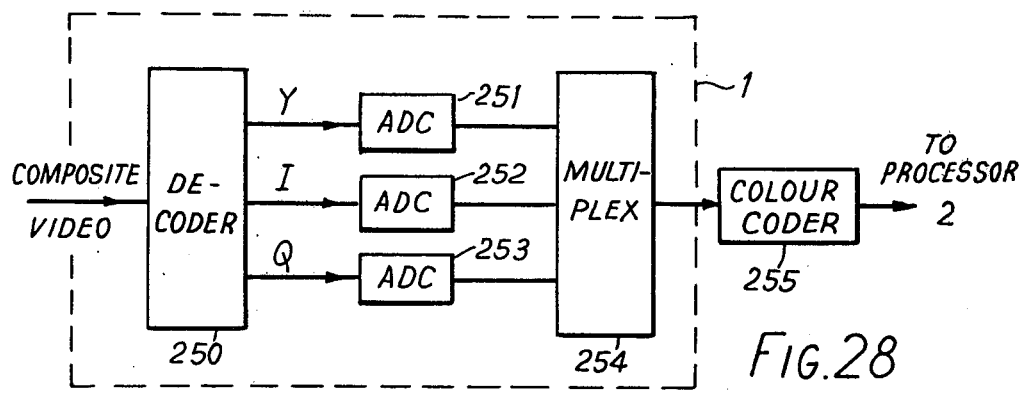
FIG. 28 shows an input system including a colour code generator for detecting whether data comprises luminance or chrominance components.

FIG. 28 shows input system 1 which has an alternative decoding and ADC converting arrangement to that of FIG. 2, but could be that shown in FIG. 2. The decoder 250 produces separate signals for luminance and colour differences (Y,I and Q). These are converted into digital form in the converters 251, 252 and 253 then multiplexed in digital multiplexer 254.

The output of the input system 1 passes to the colour code circuit 255. Although coder 255 is shown at this point in the system it could be inserted elsewhere.

Once the signal has been digitised it loses its identity and it may be difficult to determine which particular sample relates to Y or I or Q. By providing an additional piece of information (bit) carried along with each digital sample, this identifies the sample as being from either luminance or colour difference information. Thus, whenever a sample is taken from I or Q (the colour different signals) the colour code bit signifies this occurence. Later circuits are able to identify the origin of the data sample by reference to the colour code bit.

By providing this identification bit, co-efficients k11, k12 and k13 can be altered depending upon the origin of the digital data sample. It is possible to utilise a greater noise reduction for colour different signals without incurring movement portrayal distortion than may be used for luminance signals.

In principle, two sets of co-efficients are stored in the set co-efficients unit 25 utilising read only memory (ROM) techniques. Whatever luminance signals are detected the co-efficients appropriate to luminance are selected by an examination of the colour code bit in the data word.

Figure 29:
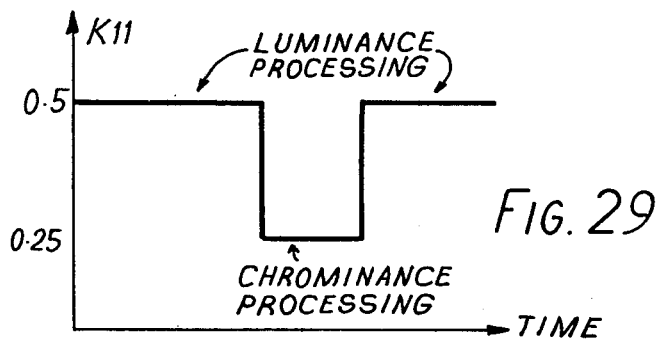
FIG. 29 shows the variation of co-efficient k11 with the colour code generated.

FIG. 29 shows the diagramatic representation of co-efficient k11 when the colour code bit is examined. Only two typical values of k11 are shown, with luminance processing, k11 is set at 0.5. When chrominance processing, k11 is set to 0.25. In this part of the description the assumption is made that k11 remains fixed irrespective of the movement detected in the picture. In practice the level of k11 will vary depending upon the movement detection system described above. Whenever colour different signals are identified k11 is altered to provide more noise reduction.

The arrangements of FIG. 2 (together with the various refinements described) have relied heavily on hardware to implement the system.

The store requires a capacity of 5 to 6 megabits operating at high speed. The input data rate is determined by the television bandwidth and lies between 10 and 20 MHz. Data from ports 2 and 3 are at similar rates.

Processing requires access to picture points surrounding the point to be synthesised. A way to achieve access to picture points is to include a number of stores exactly one line delay long or multiples thereof. The T.V. system structure makes it inconvenient to produce such 1 line stores using standard integrated circuits.

A large number of digital multipliers are required for the system described operating on real time T.V. signals between 10-20 MHz. Implementation of such multipliers may require high power dissipation and is close to the limits of practical technology as it currently exists.

Whilst the above system has been implemented, to reduce its complexity, we have produced an alternative arrangement which includes a computer controlled distributed store and processor. The system now described is highly optimised and can achieve all of the functions described above but in which the hardware arrangement is totally different. The store and processor described form a general purpose solution to the manipulation of television signals under computer control working in real time. This system is in effect a peripheral to a general purpose digital computer which is capable of operating on T.V. signals.

It is anticipated that future developments in video processing lie in the use of software which will steadily increase the scope of the processor and store system which is to be described.

Figure 30:
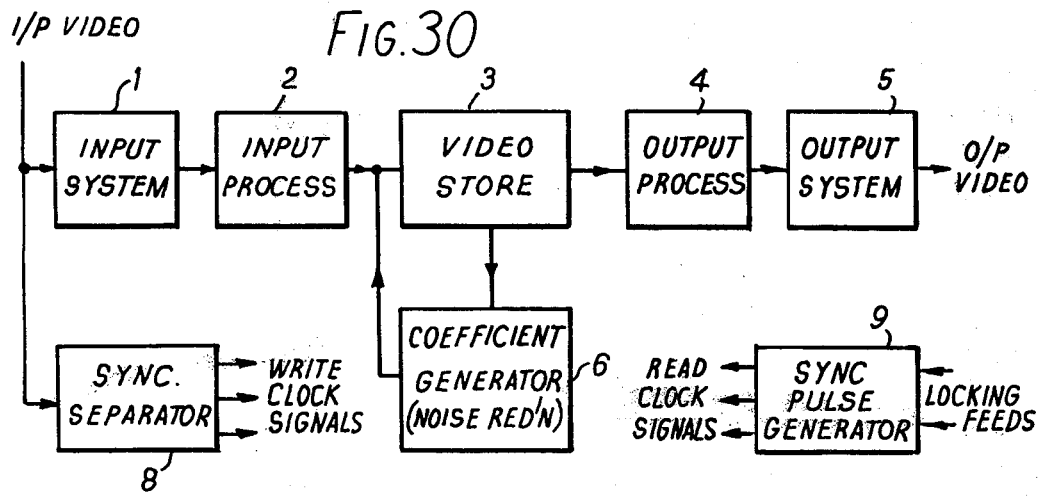
FIG. 30 shows the basic processing system including sync pulse separator and generator provided as separate units.

For a comparison between the earlier arrangements and the computer system, the processing system shown in FIG. 30 is as conceived in separate blocks. Input system 1 turns the standard analogue television signal into digital form. Input processor 2 manipulates the input data. The data is stored in the video store 3. An output processor 4 similar in form to the input process function undertakes manipulation of the output data. An output system 5 converts the digital format to a standard television analogue format. A co-efficient generator system 6 (e.g. noise reduction) is implemented by utilising an additional port from the video store and adjusting co-efficients to determine the proportion of input video which is to be stored. For the sake of completeness a sync separator 8 and sync pulse generator 9 are included although the function of these to provide timing signals in video systems is well known from earlier patents so will not be described in detail. The sync separator 8 provides the separation of the sync pulses which form part of the television signal and is capable of deriving the clock pulses needed to drive the store and the processor circuits. The sync pulse generator 9 is locked to a standard set of feed signals normally comprising sync pulses and is capable of generating the clock pulses needed to drive the store and output process functions.

FIG. 31 shows the system using a computer controlled distributed store and processor. The input system 1, output system 5, together with sync separator 8 and sync pulse generator 9 remain. The input processor 2, output processor 4 and noise reduction system 6 are now incorporated in the store and processor system 300 and no longer exist in explicit form. Once a signal has entered the input port of the store, the signal path it may take is determined by the nature of the distributed processor. The control for the system 300 is provided by computer 301.

The arrangement of the video store and processor will now be described.

FIG. 32 shows the basic process which is implemented within the distributed system. Input data is applied to one input terminal A1 of a write processor 310. The output from the write processor B1 is applied to the input P1 of a store 311. The output P2 from the store is applied to the third input C1 of the write processor.

Output P3 from the store is applied to terminal A2 of a read processor 312. Output P4 from the store is applied to the C2 terminal of a read processor. The output data from the read processor appears on terminal B2.

During a write cycle the write processor together with the terminals P1 and P2 of the store are active. The store is controlled to provide a cycle called 'Read Modify Write'. This is a standard store cycle which is provided by 16K RAM MOS store integrated circuits.

The write processor undertakes the mathematical expression below:

$$B1 = K1A1 + K2C1 + K3$$

Constants K1, K2 and K3 are set by a write co-efficients store and selector system.

During the read process store, connections P3 and P4 together with the read processor are active. P3 and P4 have access to any picture point within the store. An address system identifies the picture point which will be used. The read processor undertakes a mathematical expression below:

$$B2 = K4A2 + K5C2 + K6.$$

Co-efficients K4, K5 and K6 are set by a read co-efficients selector system.

The read process and the write process may occur asynchronously. The access of P1, P2, P3 and P4 may be any point within the picture.

Utilising the processor function described above it is possible to adjust the co-efficients K1 thru K6 to undertake all of the functions which have been described in the original provisional patent including noise reduction, picture expansion, picture compression, picture enhancement, picture shifting. The computer is used to address the store and to set the co-efficients which are to be used. A suitably designed computer programme allows this operation to be undertaken. No restriction is placed by the system upon clock speed at the input relative to the output.

Figure 33:
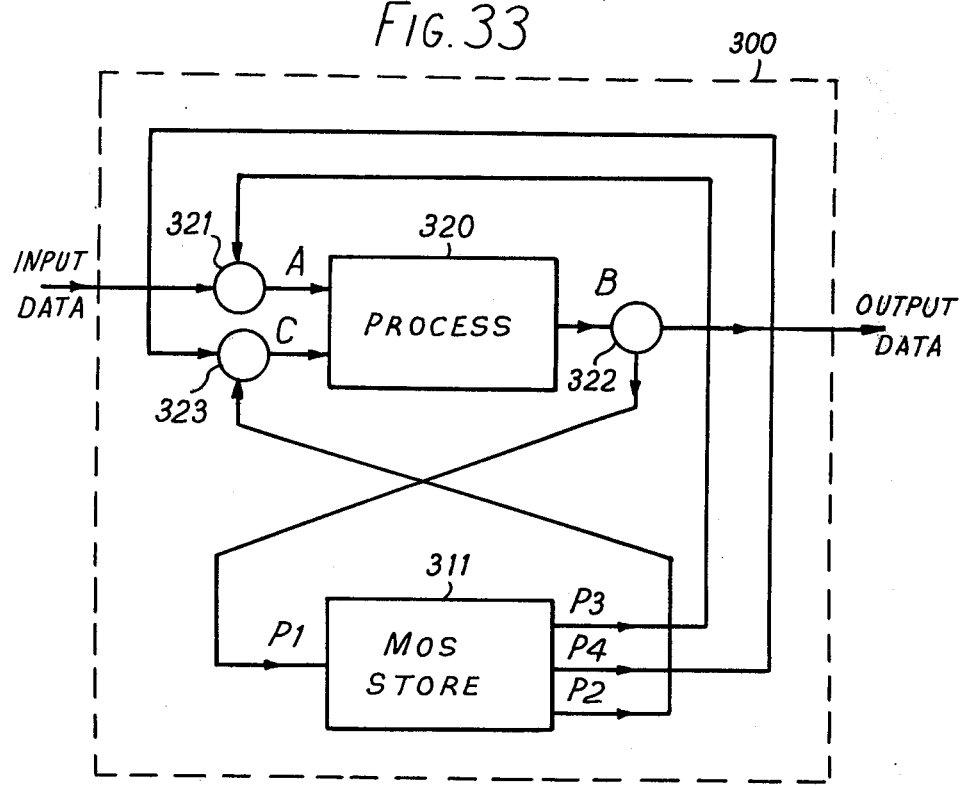
FIG. 33 shows the minimum system for processing including a single processor and store.

In the description of the basic process shown in FIG. 32 it is clear that the write process occurs at a different time from the read process. It is possible therefore to combine the write processor and the read processor into one function without sacrificing speed. The system shown in FIG. 33 is the minimum system capable of undertaking the processes needed to implement all of the functions described. A single processor 320 is multiplexed with digital switches to act first of all during the write cycle—Read Modify Write—and then during the read cycle. The processor undertakes a mathematical function below:

$$B = K1A + K2B.$$

In practice a large number of the functions may be undertaken taken utilising a special value for K1 equal to 1 minus K2.

Digital switches 321, 322 and 323 are provided to select the data paths. During the write cycle the input video is connected to terminal A of the processor. Terminal B is connected to input P1 of the MOS store, 311. Terminal P2 of the MOS store is connected to the terminal C of the processor.

During a write cycle the terminal P3 is connected to processor terminal A. Terminal P4 is connected to terminal C of the processor. The output video is taken from terminal B of the processor. The co-efficients K1 and K2 are altered according to whether a read cycle or a write cycle has been selected. The digital switches 321, 322 and 323 at terminals A, B and C respectively may be logical gates or tristate switches in practice. The MOS store need only have one input and one output together with a method of routing the data to the required terminals A and C of the processor.

A practical arrangement of the distributed store and processor is shown on FIG. 34. Input video is stored in the input buffer 330. In a practical circuit the input buffer has a capacity of 16 words each of which is 10 or 12 bits long. The processor 320 is connected to the various sources and supplies of data signals by tristate switches 321, 322 and 323. Users of logic circuits will be aware that tristate switches do not include an explicit switch function.

The processor has a capacity for multiplying 12 bit digital words by 4 bit digital words. The output from the processor is stored in a temporary store 324. The MOS store takes the form of standard 16K integrated circuits which are random access memory (RAM) devices. OUtput ports P2, P3 and P4 do not explicitly exist but are used to illustrate the use of the various parts of the circuit. During a write cycle the output from the MOS store is connected to terminal C of the processor. During a read cycle the output from the MOS store is applied first to a temporary store 331 and then to a second temporary store 332. During a read cycle the contents of temporary stores 331 and 332 are applied to the terminals A and C of the processor function. The output from the processor function at terminal B is connected via tristate logic to the output buffer 333. The output buffer is a store which will typically store 16 words 10 or 12 bits long.

Figure 35:
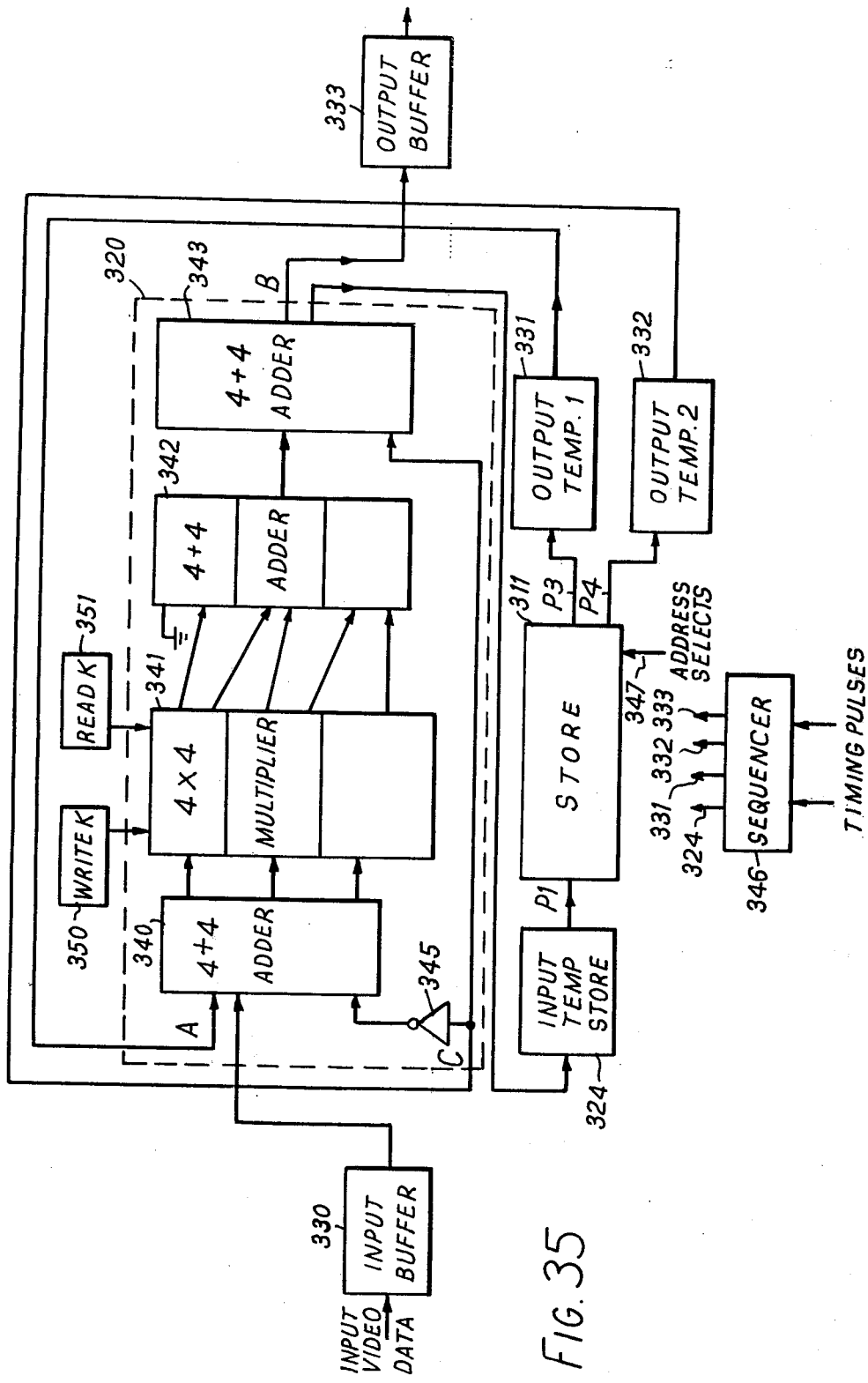
FIG. 35 shows the processor and storage system of FIG. 34 in more detail.

FIG. 35 shows the store and processor arrangement in more detail. The arrangement now described would be 1 of 16 identical circuits required to provide the necessary capacity (i.e. FIG. 35 can be provided on 1 card, a total of 16 such cards being required).

The input buffer 330 can comprise 3 integrated circuit chips type 74LS670 to provide the necessary bit handling.

The buffer output goes to the input A of adder 340 of processor 320. The adder is constructed from 3 chips each of 4×4 bits (e.g. type 74LS283). The input A is also connectible with the output of temporary store 331. Input C of the processor is connected to the other input of adder 340 via inverters 345 (e.g. type 7404). The output from adder 340 is received by the 'Wallace Tree' multiplier arrangement comprising multiplier block 341 and adder 342. Block 341 comprises three 4×4 multipliers (e.g. 74S274) which have outputs connected in Wallace Tree configuration to the adder 342 comprising three 4+4 bit adders as above. The output from the block 342 is connected to adder 343 which again comprises three 4+4 Bit adders. The other input to the adder is from C. The adder output is processor output B which passes either to output buffer 333 (3×74LS670) or to the input temporary store 324 (4×74LS174). The store 311 is constructed from 22 chips sharing common addressing 347. The input to each chip is received from a specific location in the temporary store 324. The output from each chip of the store is accessible via the temporary stores 331, 332. Each of the 22 chips of the store is a 16K RAM (e.g. MK4116). Addressing, writing and reading data into and out from such an integrated circuit RAM is well known. The temporary output store 331 has its output available to terminal A of the processor and output store 332 has its output available to terminal C of the processor.

Storage of co-efficients for the multiplier during a write cycle is undertaken by block 350 (e.g. 825184) and during a read cycle by block 351 (e.g. 74LS670). The co-efficient stores 350, 351 store several values of K which may be selected by the computer control and the system control. Sequencer block 346 (e.g. 74LS138) provides sequencing for the various temporary stores and buffers during the operation cycle under control of the timing pulses produced externally to the store. The way in which the computer can be interfaced and gain access to the addressing and control circuits of the video store has been previously described in the video processing system described in British Patent application No. 3731/76 (U.S. Ser. No. 764,317).

Figure 36:
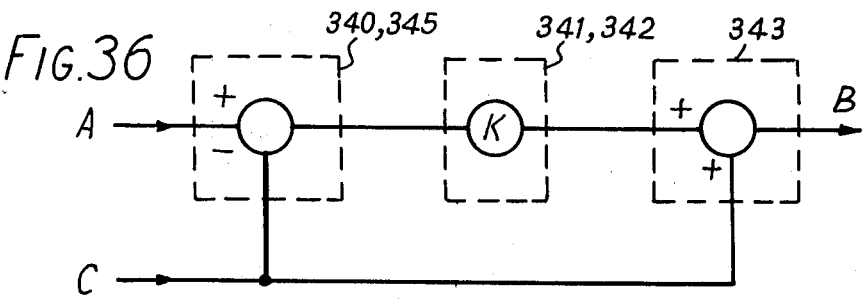
FIG. 36 shows the processing function of the processor elements of FIG. 35.

The processor function produced by the FIG. 35 arrangement is shown in FIG. 36. First adding function is effected by 340, 345, then multiplication by the co-efficients K by 341, 342 and the final adding function by 343.

We claim:

1. A T.V. picture processing system comprising:
 (a) input means for receiving T.V. picture information;
 (b) input processing means for modifying the size of the picture from information received from said input means;
 (c) storage means for storing the input processed picture information;
 (d) co-efficient generator means connected to said store for providing modification of incoming data to said store in dependence on the co-efficient generated and on data stored in said store;
 (e) output processing means for modifying the size of the picture from information received from said storage means; and
 (f) output means for receiving the information from said output processing means.

2. A processing system according to claim 1 wherein one of said input and output processing means comprises a compressor and the other of said input and output processing means comprises an expander for respectively compressing or expanding the picture size in real time.

3. A processing system according to claim 1 wherein the compressor and expander each include control means for varying the degree of expansion and compression.

4. A processor system according to claim 1, wherein the input and output processing means each include an area processor and co-efficient storage means for producing picture point data dependent on data from a number of picture points contained within a selected area modified by co-efficients provided by the co-efficient storage means.

5. A processor system according to claim 1, wherein the input and output processing means each include a volume processor and co-efficient storage means for producing picture point data dependent on data from a number of picture points contained within a selected area from a number of pictures and modified by co-efficients provided by the co-efficient storage means.

6. A processing system according to claim 1, wherein the input and output processors and the co-efficient generator means include at least one multiplier and adder to effect modification of the picture data.

7. A processing system according to claim 6, wherein the multipliers are constructed from random access memories to provide digital multiplication.

8. A processing system according to claim 1, wherein the co-efficient generator means includes a store for providing variable co-efficients to effect noise reduction on the incoming data in real time.

9. A processing system according to claim 1, wherein the co-efficient generator means includes a store for providing a cycle of variable co-efficients to effect digital standards conversion on the incoming data in real time.

10. A processing system according to claim 9 wherein the co-efficient generator means includes a cycle control for counting incoming field pulses occuring at one rate with outgoing field pulses occuring at a second rate to select the stored co-efficients in dependence on the pulses counted.

11. A processing system according to claim 1, wherein the input means include a decoder for separating the incoming T.V. information into chrominance and luminance components and an analogue to digital converter for converting the decoded information into digital form, and wherein the output means includes a digital to analogue converter for converting a digital signal from said output processing means into analogue form and an encoder for providing a composite T.V. signal from chrominance and luminance information provided at the output of said digital to analogue converter.

12. A processing system according to claim 11,
 wherein the input means includes a colour code generator for generating a code in dependence on whether luminance or chrominance components are occuring to enable modification of co-efficients to be effected whenever a change in the code is detected.

13. A processing system according to claim 1, wherein position control means are provided to enable the processed picture to be moved relative to the normal frame position.

14. A processed system according to claim 1, wherein a movement detector is provided to detect movement on the incoming picture to enable modification of co-efficients applied to the picture information to be effected whenever movement is detected.

15. A processing system according to claim 14 wherein the movement detector comprises a subtractor for evaluating the difference between two portions of picture information and comparator means for comparing the difference with a threshold level to indicate when substantial movement has occurred.

16. A processing system according to claim 14, wherein the movement detector includes an integrator for detecting the picture movement in the presence of noise.

17. A processing system according to claim 14, wherein the movement detector includes a movement code generator for producing a movement code which can accompany the picture information passing through the system.

18. A processing system according to claim 1, wherein the input and output processing means, the storage means and the co-efficient generator means are all contained within a video store and processor system accessible by a computer.

19. A processing system according to claim 18, wherein modification of the picture information by the input and output processing means and the co-efficient generator means is effected by common processors within the system.

20. A processing system according to claim 19 wherein the video store comprises a number of random access memories and the processor includes digital adders and multipliers and includes buffer storage to enable processing to be shared by common processors.

21. A processing system according to claim 18 wherein co-efficient holding means are provided with co-efficients can be modified by means of the computer.

* * * * *